United States Patent
Xue et al.

(10) Patent No.: US 11,317,438 B2
(45) Date of Patent: Apr. 26, 2022

(54) FLOATING-INSTANT COORDINATED MULTIPOINT FOR NEW RADIO-UNLICENSED

(71) Applicant: QUALCOMM Incorporated, San Diego, CA (US)

(72) Inventors: Yisheng Xue, San Diego, CA (US); Aleksandar Damnjanovic, Del Mar, CA (US); Xiaoxia Zhang, San Diego, CA (US); Jing Sun, San Diego, CA (US); Yongbin Wei, La Jolla, CA (US); Weiliang Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/894,584

(22) Filed: Jun. 5, 2020

(65) Prior Publication Data

US 2020/0396766 A1    Dec. 17, 2020

Related U.S. Application Data

(60) Provisional application No. 62/861,883, filed on Jun. 14, 2019.

(51) Int. Cl.
*H04W 74/08* (2009.01)
*H04B 7/024* (2017.01)

(52) U.S. Cl.
CPC ........ *H04W 74/0808* (2013.01); *H04B 7/024* (2013.01)

(58) Field of Classification Search
CPC ................................................ H04W 74/0808
See application file for complete search history.

(56) References Cited

U.S. PATENT DOCUMENTS

2017/0238334 A1   8/2017 Yang et al.
2018/0115347 A1   4/2018 Yerramalli et al.
(Continued)

FOREIGN PATENT DOCUMENTS

WO    WO-2017213393 A1    12/2017

OTHER PUBLICATIONS

International Search Report and Written Opinion—PCT/US2020/036610—ISA/EPO—dated Dec. 11, 2020.
(Continued)

*Primary Examiner* — Sulaiman Nooristany
(74) *Attorney, Agent, or Firm* — Qualcomm /Norton Rose Fulbright US LLP

(57) ABSTRACT

Two-phase floating-instant coordinated multipoint (CoMP) operation is disclosed. The CoMP operation may be initiated by the network via a CoMP cluster of network nodes or by user equipments (UEs) configured for uplink CoMP transmissions. The first phase is initiated after a first node to conduct a successful full listen before talk (LBT) procedure signals the other participating nodes to perform an abbreviated LBT procedure and identifies the beginning of the second phase. After success of the full and abbreviated LBT procedures, each associated node will initiate a first transmission in the first phase. The leading node determines how many of the other nodes are available for transmission and decides, based on that amount and the rules of the network, whether to continue with the CoMP operations. If enough of the other nodes are available, the participating nodes will conduct the CoMP transmissions at the identified beginning of the second phase.

17 Claims, 16 Drawing Sheets

(56) References Cited

U.S. PATENT DOCUMENTS

2019/0150198 A1\* 5/2019 Sun ..................... H04L 5/0048
370/329
2019/0174542 A1 6/2019 Lei et al.

OTHER PUBLICATIONS

Partial International Search Report—PCT/US2020/036610—ISA/EPO—dated Sep. 10, 2020.

\* cited by examiner

FLOATING-INSTANT COORDINATED MULTIPOINT FOR NEW RADIO-UNLICENSED

CROSS-REFERENCE TO RELATED APPLICATIONS

This application claims the benefit of U.S. Provisional Patent Application No. 62/861,883, entitled, "FLOATING-INSTANT COMP FOR NR-U," filed on Jun. 14, 2019, which is expressly incorporated by reference herein in its entirety.

BACKGROUND

Field

Aspects of the present disclosure relate generally to wireless communication systems, and more particularly, to floating-instant coordinated multipoint (CoMP) operations for new radio (NR) unlicensed (NR-U) networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of network nodes, base stations, or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a two-phase floating-instant coordinated multipoint (CoMP) operation is provided. The CoMP operation may be initiated either by the network via a CoMP cluster of network nodes or by user equipments (UEs) configured for uplink CoMP transmissions. The first phase of the floating-instant CoMP operation is initiated after a first node to conduct a successful full listen before talk (LBT) procedure. This first or leading node signals the other participating nodes to perform an abbreviated LBT procedure and identifies the beginning of the second phase. After success of the full and abbreviated LBT procedures, each associated node will initiate a first transmission in the first phase. The leading node determines how many of the other nodes are available for transmission and decides, based on that amount and the rules of the network, whether to continue with the CoMP operations. If enough of the other nodes are available, the participating nodes will conduct the CoMP transmissions at the identified beginning of the second phase.

In an additional aspect of the disclosure, a method of wireless communication includes performing, by a network node, a full LBT procedure on a shared communication channel in response to receipt of a trigger signal from a primary network node of a CoMP cluster including the network node, in response to success of the full LBT procedure, initiating, by the network node, transmissions of downlink data to a served UE; and transmitting, by the network node, a CoMP scheduling message to each additional network node scheduled for CoMP transmission, wherein the CoMP scheduling message identifies a first schedule point for the each additional network node to perform an abbreviated LBT procedure on the shared communication channel and a second schedule point for initiating CoMP transmissions, monitoring, by the network node, for an availability signal from the each additional network node reporting results of the abbreviated LBT procedure, and switching, by the network node, the transmissions to joint CoMP transmissions with one or more available nodes of the each additional network node from which the network node detects the availability signal identifies success of the abbreviated LBT procedure.

In an additional aspect of the disclosure, a method of wireless communication includes performing, by a network node, a full LBT procedure on a shared communication channel in response to receipt of a trigger signal from a primary network node of a CoMP cluster including the network node, receiving, by the network node prior to completion of the full LBT procedure, a CoMP scheduling message from a leading network node of the CoMP cluster, wherein the CoMP scheduling message identifies a first schedule point for the network node to perform an abbreviated LBT procedure and a second schedule point for initiating CoMP transmissions, performing, by the network node, the abbreviated LBT procedure on the shared communication channel at the first schedule point, reporting, by the network node, results of the abbreviated LBT procedure to the leading network node, and commencing, by the network node, joint CoMP transmissions with the leading network node at the second schedule point in response to success of the abbreviated LBT procedure.

In an additional aspect of the disclosure, a method of wireless communication includes obtaining, by a user equipment (UE), a configured uplink grant identifying a set of resources during which the UE may perform uplink transmissions without an uplink grant, wherein the set of resources are shared between one or more additional UEs, performing, by the UE, a full LBT procedure on the set of resources, in response to success of the full LBT procedure, transmitting, by the UE, a unique identifier (ID) of the UE to one or more network nodes of a CoMP cluster, and transmitting, by the UE uplink data to one or more network nodes of the CoMP cluster, receiving, by the UE, an authorization signal from at least one network node of the CoMP cluster, and continuing, by the UE, transmission of the uplink data in response to receipt of the authorization signal.

In an additional aspect of the disclosure, a method of wireless communication includes obtaining, by a UE, a resource configuration identifying a first set of resources during which the UE may perform uplink transmissions in response to a conditional grant, wherein the first set of resources are shared between one or more additional UEs, receiving, by the UE, a CoMP scheduling message from a serving network node, wherein the CoMP scheduling message includes a conditional uplink grant and second schedule point identifying a second set of resources for the UE to monitor for a scheduled uplink grant, performing, by the UE, an abbreviated LBT procedure on the first set of resources in response to the conditional uplink grant, transmitting, by the UE, uplink data on the first set of resources in response to success of the abbreviated LBT procedure, monitoring, by the UE, the second schedule point for the scheduled uplink grant at the second set of resources, and continuing transmission, by the UE, of the uplink data in response to detection of the scheduled uplink grant, wherein the uplink data is transmitted on an allocated set of resources assigned in the scheduled uplink grant.

In an additional aspect of the disclosure, a method of wireless communication includes performing, by a network node, a full LBT procedure on a shared communication channel in response to receipt of a trigger signal from a primary network node of a CoMP cluster including the network node, transmitting, by the network node in response to success of the full LBT procedure, an uplink CoMP scheduling message to each served UE scheduled for uplink CoMP transmission, wherein the uplink CoMP scheduling message identifies a conditional uplink grant for the each served UE to perform an abbreviated LBT procedure on a pre-configured set of resources on the shared communication channel and a second schedule point identifying a second set of resources for the each served UE to monitor for a scheduled uplink grant, monitoring, by the network node, for uplink data from the each served UE, and in response to detection, by the network node, of the uplink data from one or more available UEs of the each served UE, transmitting, by the network node, a scheduled uplink grant to the one or more available UEs, wherein the scheduled uplink grant allocates a third set of resources for the one or more UEs to continue transmission of the uplink data.

In an additional aspect of the disclosure, an apparatus configured for wireless communication includes means for performing, by a network node, a full LBT procedure on a shared communication channel in response to receipt of a trigger signal from a primary network node of a CoMP cluster including the network node, means, executable in response to success of the full LBT procedure, for initiating, by the network node, transmissions of downlink data to a served UE; and for transmitting, by the network node, a CoMP scheduling message to each additional network node scheduled for CoMP transmission, wherein the CoMP scheduling message identifies a first schedule point for the each additional network node to perform an abbreviated LBT procedure on the shared communication channel and a second schedule point for initiating CoMP transmissions, means for monitoring, by the network node, for an availability signal from the each additional network node reporting results of the abbreviated LBT procedure, and means for switching, by the network node, the transmissions to joint CoMP transmissions with one or more available nodes of the each additional network node from which the network node detects the availability signal identifies success of the abbreviated LBT procedure.

In an additional aspect of the disclosure, an apparatus configured for wireless communication includes means for performing, by a network node, a full LBT procedure on a shared communication channel in response to receipt of a trigger signal from a primary network node of a CoMP cluster including the network node, means for receiving, by the network node prior to completion of the full LBT procedure, a CoMP scheduling message from a leading network node of the CoMP cluster, wherein the CoMP scheduling message identifies a first schedule point for the network node to perform an abbreviated LBT procedure and a second schedule point for initiating CoMP transmissions, means for performing, by the network node, the abbreviated LBT procedure on the shared communication channel at the first schedule point, means for reporting, by the network node, results of the abbreviated LBT procedure to the leading network node, and means for commencing, by the network node, joint CoMP transmissions with the leading network node at the second schedule point in response to success of the abbreviated LBT procedure.

In an additional aspect of the disclosure, an apparatus configured for wireless communication includes means for obtaining, by a UE, a configured uplink grant identifying a set of resources during which the UE may perform uplink transmissions without an uplink grant, wherein the set of resources are shared between one or more additional UEs, means for performing, by the UE, a full LBT procedure on the set of resources, means, executable in response to success of the full LBT procedure, for transmitting, by the UE, a unique identifier (ID) of the UE to one or more network node of a CoMP cluster, and for transmitting, by the UE uplink data to one or more network node of the CoMP cluster, means for receiving, by the UE, an authorization signal from at least one network node of the CoMP cluster, and means for continuing, by the UE, transmission of the uplink data in response to receipt of the authorization signal.

In an additional aspect of the disclosure, an apparatus configured for wireless communication includes means for obtaining, by a UE, a resource configuration identifying a first set of resources during which the UE may perform uplink transmissions in response to a conditional grant, wherein the first set of resources are shared between one or more additional UEs, means for receiving, by the UE, a CoMP scheduling message from a serving network node, wherein the CoMP scheduling message includes a conditional uplink grant and second schedule point identifying a second set of resources for the UE to monitor for a scheduled uplink grant, means for performing, by the UE, an abbreviated LBT procedure on the first set of resources in response to the conditional uplink grant, means for transmitting, by the UE, uplink data on the first set of resources in response to success of the abbreviated LBT procedure, means for monitoring, by the UE, the second schedule point for the scheduled uplink grant at the second set of resources, and means for continuing transmission, by the UE, of the uplink data in response to detection of the scheduled uplink grant, wherein the uplink data is transmitted on an allocated set of resources assigned in the scheduled uplink grant.

In an additional aspect of the disclosure, an apparatus configured for wireless communication includes means for performing, by a network node, a full LBT procedure on a shared communication channel in response to receipt of a trigger signal from a primary network node of a CoMP cluster including the network node, means for transmitting, by the network node in response to success of the full LBT procedure, an uplink CoMP scheduling message to each served UE scheduled for uplink CoMP transmission, wherein the uplink CoMP scheduling message identifies a conditional uplink grant for the each served UE to perform an abbreviated LBT procedure on a pre-configured set of resources on the shared communication channel and a second schedule point identifying a second set of resources for the each served UE to monitor for a scheduled uplink grant, means for monitoring, by the network node, for uplink data from the each served UE, and means, executable in response to detection, by the network node, of the uplink data from one or more available UEs of the each served UE for transmitting, by the network node, a scheduled uplink grant to the one or more available UEs, wherein the scheduled uplink grant allocates a third set of resources for the one or more UEs to continue transmission of the uplink data.

In an additional aspect of the disclosure, a non-transitory computer-readable medium having program code recorded thereon. The program code further includes code to perform, by a network node, a full LBT procedure on a shared communication channel in response to receipt of a trigger signal from a primary network node of a CoMP cluster including the network node code, executable in response to success of the full LBT procedure, to initiate, by the network node, transmissions of downlink data to a served UE; and to transmit, by the network node, a CoMP scheduling message to each additional network node scheduled for CoMP transmission, wherein the CoMP scheduling message identifies a first schedule point for the each additional network node to perform an abbreviated LBT procedure on the shared communication channel and a second schedule point for initiating CoMP transmissions, code to monitor, by the network node, for an availability signal from the each additional network node reporting results of the abbreviated LBT procedure, and code to switch, by the network node, the transmissions to joint CoMP transmissions with one or more available nodes of the each additional network node from which the network node detects the availability signal identifies success of the abbreviated LBT procedure.

In an additional aspect of the disclosure, a non-transitory computer-readable medium having program code recorded thereon. The program code further includes code to perform, by a network node, a full LBT procedure on a shared communication channel in response to receipt of a trigger signal from a primary network node of a CoMP cluster configured for the network node and at least one neighboring network node, code to receive, by the network node prior to completion of the full LBT procedure, a CoMP scheduling message from a leading network node of the CoMP cluster, wherein the CoMP scheduling message identifies a first schedule point for the network node to perform an abbreviated LBT procedure and a second schedule point for initiating CoMP transmissions, code to perform, by the network node, the abbreviated LBT procedure on the shared communication channel at the first schedule point, code to report, by the network node, results of the abbreviated LBT procedure to the leading network node, and code to commence, by the network node, joint CoMP transmissions with the leading network node at the second schedule point in response to success of the abbreviated LBT procedure.

In an additional aspect of the disclosure, a non-transitory computer-readable medium having program code recorded thereon. The program code further includes code to obtain, by a UE, a configured uplink grant identifying a set of resources during which the UE may perform uplink transmissions without an uplink grant, wherein the set of resources are shared between one or more additional UEs, code to perform, by the UE, a full LBT procedure on the set of resources, code, executable in response to success of the full LBT procedure, to transmit, by the UE, a unique ID of the UE to one or more network node of a CoMP cluster, and to transmit, by the UE uplink data to one or more network node of the CoMP cluster, code to receive, by the UE, an authorization signal from at least one network node of the CoMP cluster, and code to continuing, by the UE, transmission of the uplink data in response to receipt of the authorization signal.

In an additional aspect of the disclosure, a non-transitory computer-readable medium having program code recorded thereon. The program code further includes code to obtain, by a UE, a resource configuration identifying a first set of resources during which the UE may perform uplink transmissions in response to a conditional grant, wherein the first set of resources are shared between one or more additional UEs, code to receive, by the UE, a CoMP scheduling message from a serving network node, wherein the CoMP scheduling message includes a conditional uplink grant and second schedule point identifying a second set of resources for the UE to monitor for a scheduled uplink grant, code to perform, by the UE, an abbreviated LBT procedure on the first set of resources in response to the conditional uplink grant, code to transmit, by the UE, uplink data on the first set of resources in response to success of the abbreviated LBT procedure, code to monitor, by the UE, the second schedule point for the scheduled uplink grant at the second set of resources, and code to continue transmission, by the UE, of the uplink data in response to detection of the scheduled uplink grant, wherein the uplink data is transmitted on an allocated set of resources assigned in the scheduled uplink grant.

In an additional aspect of the disclosure, a non-transitory computer-readable medium having program code recorded thereon. The program code further includes code to perform, by a network node, a full LBT procedure on a shared communication channel in response to receipt of a trigger signal from a primary network node of a CoMP cluster including the network node, code to transmit, by the network node in response to success of the full LBT procedure, an uplink CoMP scheduling message to each served UE scheduled for uplink CoMP transmission, wherein the uplink CoMP scheduling message identifies a conditional uplink grant for the each served UE to perform an abbreviated LBT procedure on a pre-configured set of resources on the shared communication channel and a second schedule point identifying a second set of resources for the each served UE to monitor for a scheduled uplink grant, code to monitor, by the network node, for uplink data from the each served UE, and code, executable in response to detection, by the network node, of the uplink data from one or more available UEs of the each served UE to transmit, by the network node, a scheduled uplink grant to the one or more available UEs, wherein the scheduled uplink grant allocates a third set of resources for the one or more UEs to continue transmission of the uplink data.

In an additional aspect of the disclosure, an apparatus configured for wireless communication is disclosed. The apparatus includes at least one processor, and a memory coupled to the processor. The processor is configured to perform, by a network node, a full LBT procedure on a shared communication channel in response to receipt of a trigger signal from a primary network node of a CoMP cluster including the network node, configuration, executable in response to success of the full LBT procedure, to initiate, by the network node, transmissions of downlink data to a served UE; and to transmit, by the network node, a CoMP scheduling message to each additional network node scheduled for CoMP transmission, wherein the CoMP scheduling message identifies a first schedule point for the each additional network node to perform an abbreviated LBT procedure on the shared communication channel and a second schedule point for initiating CoMP transmissions, to monitor, by the network node, for an availability signal from the each additional network node reporting results of the abbreviated LBT procedure, and to switch, by the network node, the transmissions to joint CoMP transmissions with one or more available nodes of the each additional network node from which the network node detects the availability signal identifies success of the abbreviated LBT procedure.

In an additional aspect of the disclosure, an apparatus configured for wireless communication is disclosed. The apparatus includes at least one processor, and a memory coupled to the processor. The processor is configured to perform, by a network node, a full LBT procedure on a shared communication channel in response to receipt of a trigger signal from a primary network node of a CoMP cluster including the network node, to receive, by the network node prior to completion of the full LBT procedure, a CoMP scheduling message from a leading network node of the CoMP cluster, wherein the CoMP scheduling message identifies a first schedule point for the network node to perform an abbreviated LBT procedure and a second schedule point for initiating CoMP transmissions, to perform, by the network node, the abbreviated LBT procedure on the shared communication channel at the first schedule point, to report, by the network node, results of the abbreviated LBT procedure to the leading network node, and to commence, by the network node, joint CoMP transmissions with the leading network node at the second schedule point in response to success of the abbreviated LBT procedure.

In an additional aspect of the disclosure, an apparatus configured for wireless communication is disclosed. The apparatus includes at least one processor, and a memory coupled to the processor. The processor is configured to obtain, by a UE, a configured uplink grant identifying a set of resources during which the UE may perform uplink transmissions without an uplink grant, wherein the set of resources are shared between one or more additional UEs, to perform, by the UE, a full LBT procedure on the set of resources, configuration, executable in response to success of the full LBT procedure, to transmit, by the UE, a unique ID of the UE to one or more network nodes of a CoMP cluster, and to transmit, by the UE uplink data to one or more network nodes of the CoMP cluster, to receive, by the UE, an authorization signal from at least one network node of the CoMP cluster, and to continuing, by the UE, transmission of the uplink data in response to receipt of the authorization signal.

In an additional aspect of the disclosure, an apparatus configured for wireless communication is disclosed. The apparatus includes at least one processor, and a memory coupled to the processor. The processor is configured to obtain, by a UE, a resource configuration identifying a first set of resources during which the UE may perform uplink transmissions in response to a conditional grant, wherein the first set of resources are shared between one or more additional UEs, to receive, by the UE, a CoMP scheduling message from a serving network node, wherein the CoMP scheduling message includes a conditional uplink grant and second schedule point identifying a second set of resources for the UE to monitor for a scheduled uplink grant, to perform, by the UE, an abbreviated LBT procedure on the first set of resources in response to the conditional uplink grant, to transmit, by the UE, uplink data on the first set of resources in response to success of the abbreviated LBT procedure, to monitor, by the UE, the second schedule point for the scheduled uplink grant at the second set of resources, and to continue transmission, by the UE, of the uplink data in response to detection of the scheduled uplink grant, wherein the uplink data is transmitted on an allocated set of resources assigned in the scheduled uplink grant.

In an additional aspect of the disclosure, an apparatus configured for wireless communication is disclosed. The apparatus includes at least one processor, and a memory coupled to the processor. The processor is configured to perform, by a network node, a full LBT procedure on a shared communication channel in response to receipt of a trigger signal from a primary network node of a CoMP cluster including the network node, to transmit, by the network node in response to success of the full LBT procedure, an uplink CoMP scheduling message to each served UE scheduled for uplink CoMP transmission, wherein the uplink CoMP scheduling message identifies a conditional uplink grant for the each served UE to perform an abbreviated LBT procedure on a pre-configured set of resources on the shared communication channel and a second schedule point identifying a second set of resources for the each served UE to monitor for a scheduled uplink grant, to monitor, by the network node, for uplink data from the each served UE, and configuration, executable in response to detection, by the network node, of the uplink data from one or more available UEs of the each served UE to transmit, by the network node, a scheduled uplink grant to the one or more available UEs, wherein the scheduled uplink grant allocates a third set of resources for the one or more UEs to continue transmission of the uplink data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
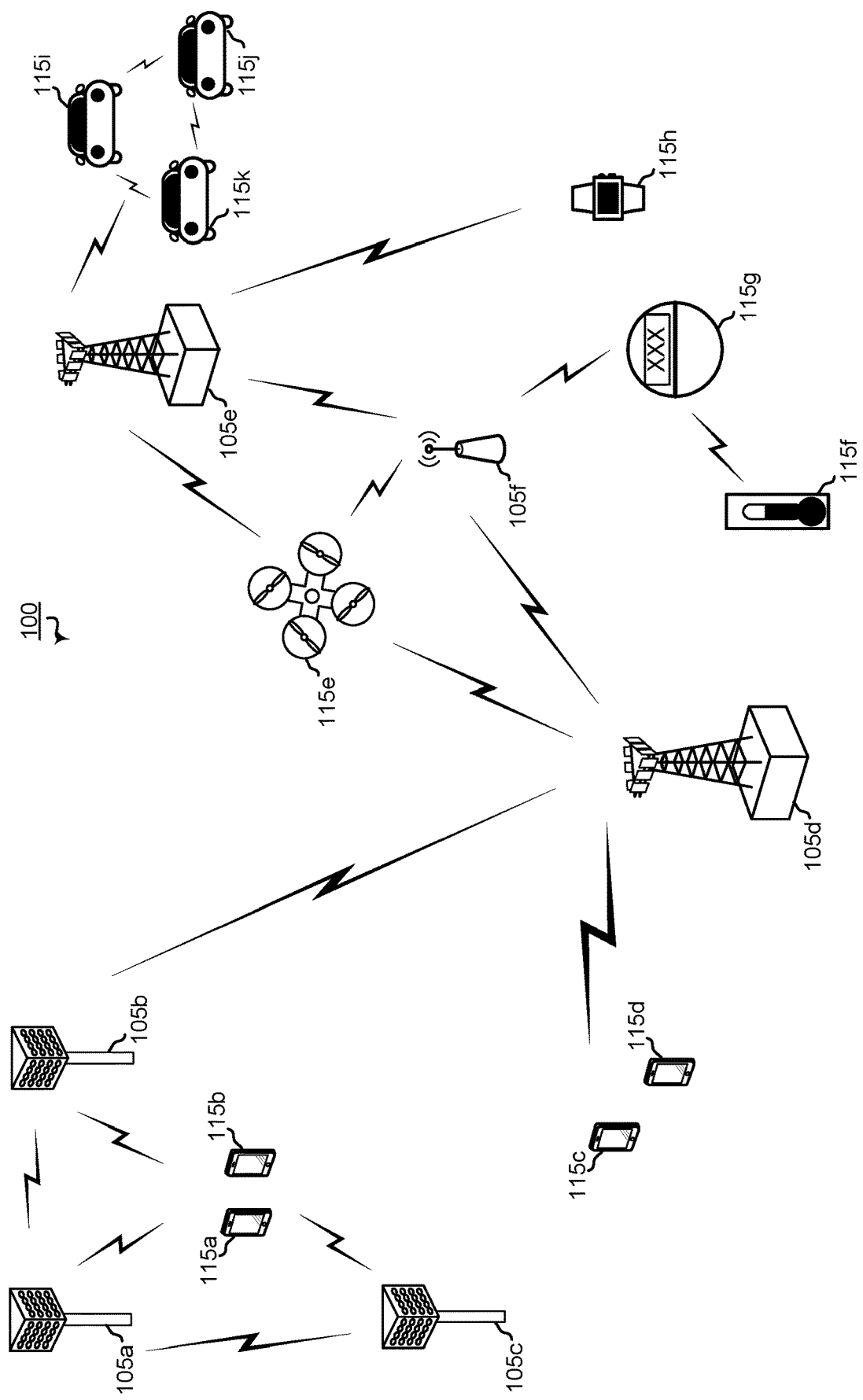
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various network nodes or base stations and UEs configured according to aspects of the present disclosure. The 5G network 100 includes a number of network nodes 105 and other network entities. A base station may be a station that communicates with the UEs and may also be referred to as a network node, an evolved node B (eNB), a next generation eNB (gNB), an access point, and the like. Each network node 105 may provide communication coverage for a particular geographic area. In 3GPP, the term "cell" can refer to this particular geographic coverage area of a network node, a base station and/or a base station subsystem serving the coverage area, depending on the context in which the term is used.

A base station or network node may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station or network node for a macro cell may be referred to as a macro network node. A network node for a small cell may be referred to as a small cell network node, a pico network node, a femto network node or a home network node. In the example shown in FIG. 1, the network nodes 105*d* and 105*e* are regular macro base stations, while network nodes 105*a*-105*c* are macro base stations enabled with one of 3 dimension (3D), full dimension (FD), or massive MIMO. Network nodes 105*a*-105*c* take advantage of their higher dimension MIMO capabilities to exploit 3D beamforming in both elevation and azimuth beamforming to increase coverage and capacity. Network node 105*f* is a small cell base station which may be a home node or portable access point. A base station or network node may support one or multiple (e.g., two, three, four, and the like) cells.

The 5G network 100 may support synchronous or asynchronous operation. For synchronous operation, the base stations or network nodes may have similar frame timing, and transmissions from different base stations may be approximately aligned in time. For asynchronous operation, the base stations or network nodes may have different frame timing, and transmissions from different network nodes may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the network nodes, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, network nodes 105*a*-105*c* serve UEs 115*a* and 115*b* using 3D beamforming and coordinated spatial techniques, such as coordinated multipoint (CoMP) or multi-connectivity. Macro network node 105*d* performs backhaul communications with network nodes 105*a*-105*c*, as well as small cell, network node 105*f*.

Macro network node 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro network nodes 105d and 105e, as well as small cell network node 105f. Other machine type devices, such as UE 115f (thermometer), UE 115g (smart meter), and UE 115h (wearable device) may communicate through 5G network 100 either directly with network nodes, such as small cell network node 105f, and macro network node 105e, or in multi-hop configurations by communicating with another user device which relays its information to the network, such as UE 115f communicating temperature measurement information to the smart meter, UE 115g, which is then reported to the network through small cell network node 105f. 5G network 100 may also provide additional network efficiency through dynamic, low-latency TDD/FDD communications, such as in a vehicle-to-vehicle (V2V) mesh network between UEs 115i-115k communicating with macro network node 105e.

The 5G network 100 may also be an NR-U network configured to provide the floating-instant CoMP operations according to the aspects of the present disclosure. For example, network nodes 105a-105c may be configured as a CoMP cluster that serves UEs 115a-115b. LBT trigger signals from the network may cause each of network nodes 105a-105c to perform full listen before talk (LBT) procedures on a shared communication channel. The first network node to detect success of the LBT procedure may initiate phase one of the floating-instant CoMP operation, where this first network node, the leading network node, sends a single downlink transmission to its served UE and send CoMP scheduling messages to the other network nodes which identify a location for the other network node to perform an abbreviated LBT procedure and a second location to begin joint CoMP transmissions.

The non-leading network nodes may perform the abbreviated LBT and, if successful, send single downlink transmissions to their own served UEs. The non-leading network nodes may further send an availability signal to the leading network node indicating that the non-leading network nodes are available for CoMP transmissions. If the number of non-leading network nodes indicating their availability meets the network rules for CoMP operations, the leading network node may then initiate the second phase of the floating-instant CoMP operation by conducting joint CoMP transmissions with the other non-leading network nodes.

Such an NR-U network as may be illustrated by 5G network 100 may be configured for the UE-initiated CoMP aspect of the present disclosure. When multiple UEs, such as UEs 115a-115b, are pre-configured with configured uplink grants that provide access opportunity to the shared channel at the same configured resources, UEs 115a-115b may perform a full LBT procedure on the shared channel at the configured uplink resources. When success of the LBT procedures is detected, UEs 115a-115b send an uplink signal with uplink data and a unique identifier (ID) identifying the UE to the serving network node (e.g., network node 105a-105c), if the number of UEs that pass the full LBT signal the serving network node meet the CoMP transmission rules of the network, the serving network node can signal UEs 115a-115b to continue the uplink transmissions.

Similarly, UEs 115a-115b may trigger downlink CoMP according to the two phase floating-instant CoMP operation by transmitting the uplink signal with the uplink data and unique ID after detecting success of the full LBT procedure performed by UEs 115a-115b, as described above. The uplink signals trigger the serving network node of the first UE to detect success to begin the two phase floating-instant CoMP operations.

Figure 2:
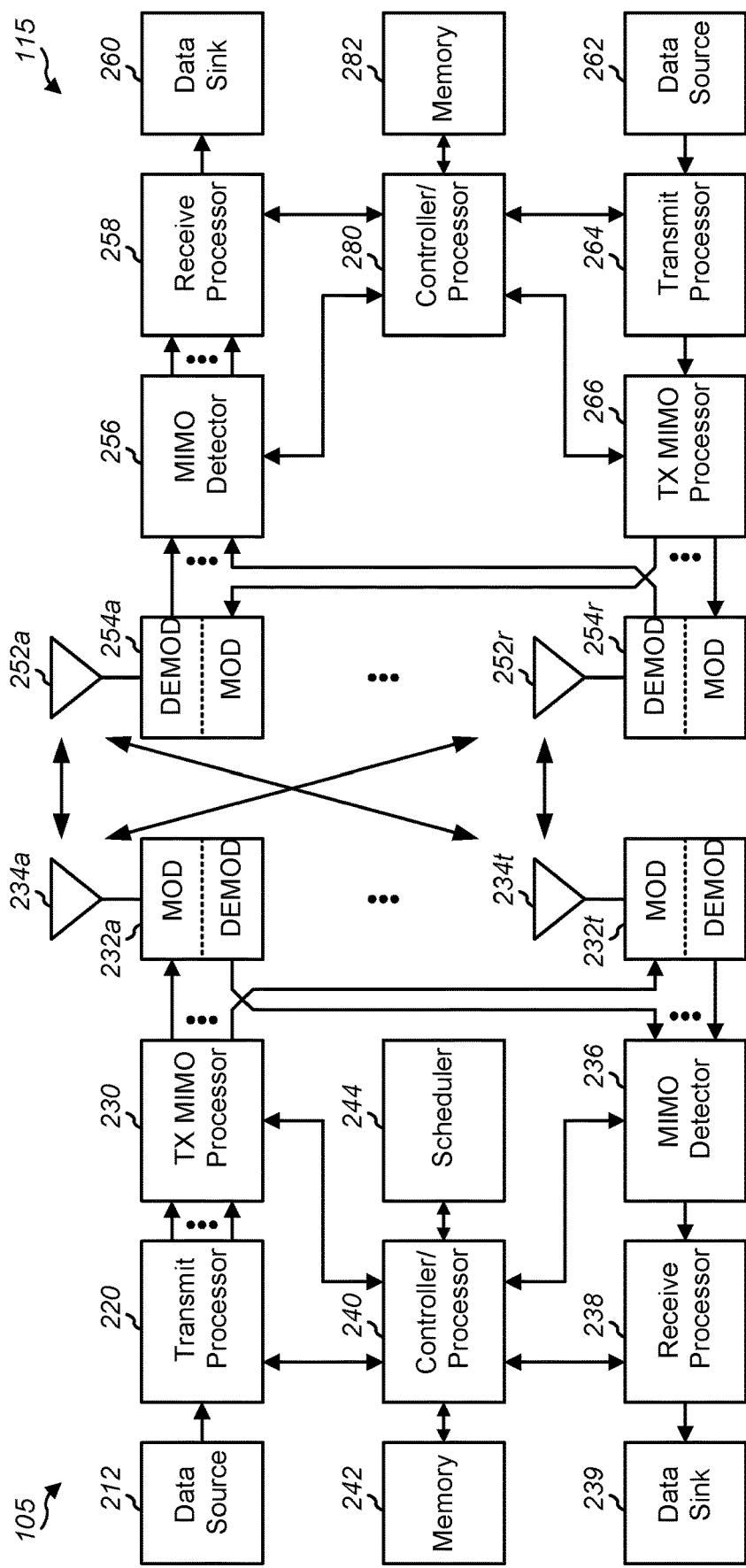
FIG. 2 is a block diagram illustrating a design of a base station and a UE configured according to one aspect of the present disclosure.

FIG. 2 shows a block diagram of a design of a network node 105 and a UE 115, which may be one of the network node and one of the UEs in FIG. 1. At the network node 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the network node 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the network node 105. At the network node 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the network node 105 and the UE 115, respectively. The controller/processor 240 and/or other processors and modules at the network node 105 may perform or direct the execution of various processes for the techniques described herein. The controllers/processor 280 and/or other processors and modules at the UE 115 may also perform or direct the execution of the functional blocks illustrated in FIGS. 5A, 5B, 5C, and 9, and/or other processes for the techniques described herein. The memories 242 and 282 may store data and program codes for the network node 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and network node 105 may operate in a shared radio frequency spectrum band, which may include licensed or unlicensed (e.g., contention-based) frequency spectrum. In an unlicensed frequency portion of the shared radio frequency spectrum band, UEs 115 or network nodes 105 may traditionally perform a medium-sensing procedure to contend for access to the frequency spectrum. For example, UE 115 or network node 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, network nodes 105 and UEs 115 may be operated by the same or different network operating entities. In some examples, an individual network node 105 or UE 115 may be operated by more than one network operating entity. In other examples, each network node 105 and UE 115 may be operated by a single network operating entity. Requiring each network node 105 and UE 115 of different network operating entities to contend for shared resources may result in increased signaling overhead and communication latency.

Figure 3:
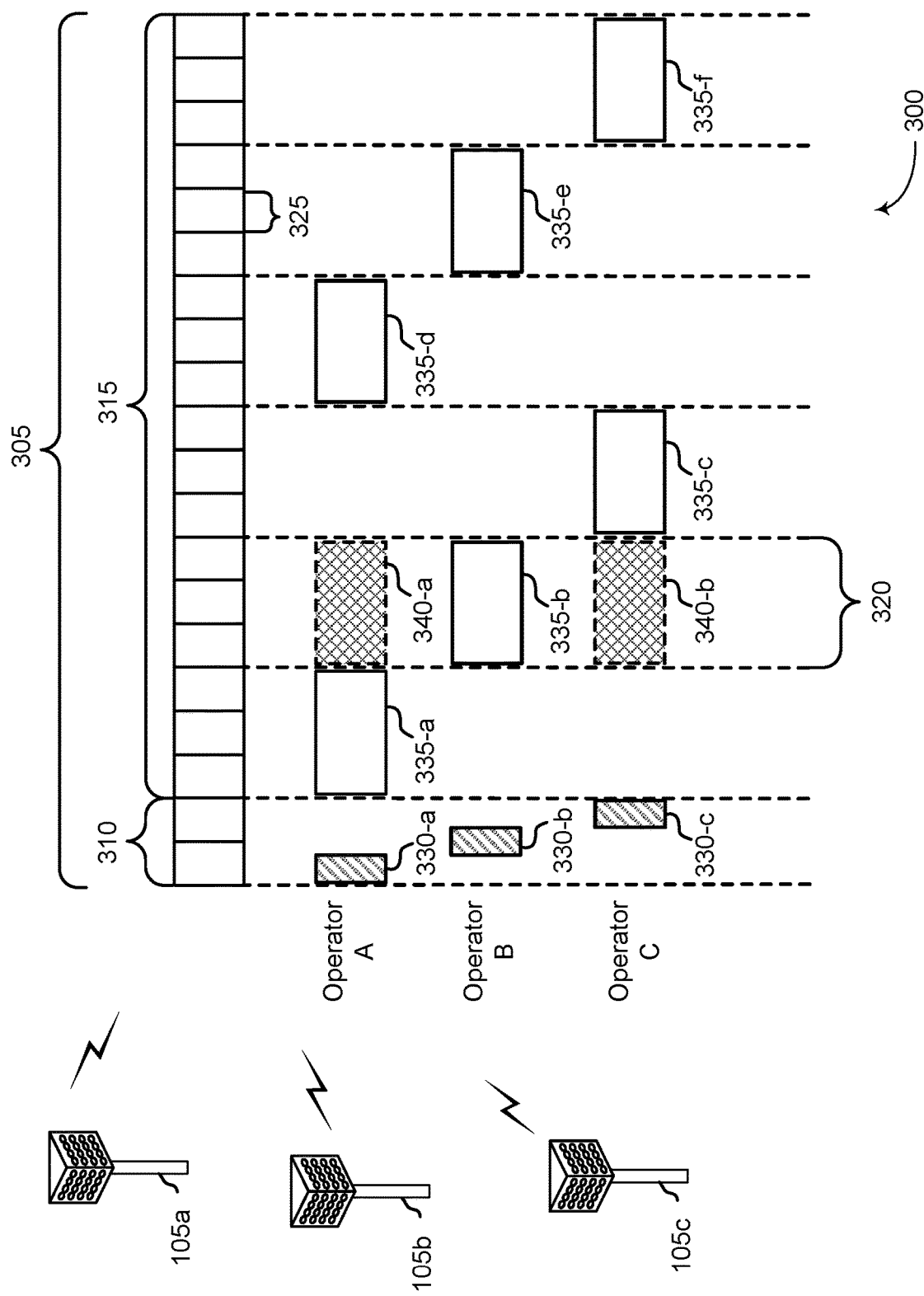
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through network node 105a, resources 330-b may be reserved for exclusive communications by Operator B, such as through network node 105b, and resources 330-c may be reserved for exclusive communications by Operator C, such as through network node 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or network nodes 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Coordinated multipoint (CoMP) operations have been implemented in several legacy implementations of wireless communication networks to improve the reliability and throughput of communications between multiple network nodes and a UE. As networks and network technologies have advanced, situations have been created where multiple network nodes may be performing communications, including competing for communications on shared communication spectrum. Further refined CoMP operations have included consideration of synchronous and asynchronous CoMP operations. Synchronous CoMP has been considered for years in which multiple (e.g., 2, 3) participating operators may be synchronous to a common clock. The respective operators may attempt to access the shared channel at predefined instants defined by the common clock together with pre-defined operator priorities at the respective instants. However, such synchronous CoMP operations have a limited capability to scale with respect to the number of operators and do not have an efficient means for co-channel coexistence with available/coming unlicensed spectrum systems (e.g., WiFi, LAA, NR-U, etc.).

Asynchronous CoMP in unlicensed spectrum has also been considered at the theoretical level for years. Much of the considering of asynchronous CoMP have resulted in unfavorable views because the dominating carrier sense multiple access/collision avoidance (CSMA/CA) engine used for such asynchronous operations has typically been designed for individual channel access. While consideration continues, there has yet to be wide acceptance in standards organizations, such as 3GPP, because of the limited application of the current operation models. Recently, however, a type of asynchronous CoMP operation has been included within the scope of IEEE 802.11be (WiFi EHT).

For example, consider three network nodes from the same operator that are organized into a CoMP cluster. Each such network node may be connected by back-haul/front-haul with ms-level latency. The three network nodes as a group attempt to reserve the shared channel using CSMA/CA-based protocol. However, the zero-forcing, block diagonal (ZF-BD)-based downlink joint transmission of the three network nodes would happen when all three network nodes clear the shared channel. The target UEs would perform a joint linear minimum mean square error (LMMSE) analysis for uplink joint reception.

Solutions have been previously suggested for providing an alternative to asynchronous CoMP operations in NR-U networks. One such suggested solution defines a floating-instant CoMP operation in which the network triggers CoMP cluster network nodes to attempt access to shared communication spectrum using a full LBT procedure. The first of these network node to successfully clear the full LBT procedure may then lead the CoMP cluster for joint CoMP transmissions.

Figure 4:
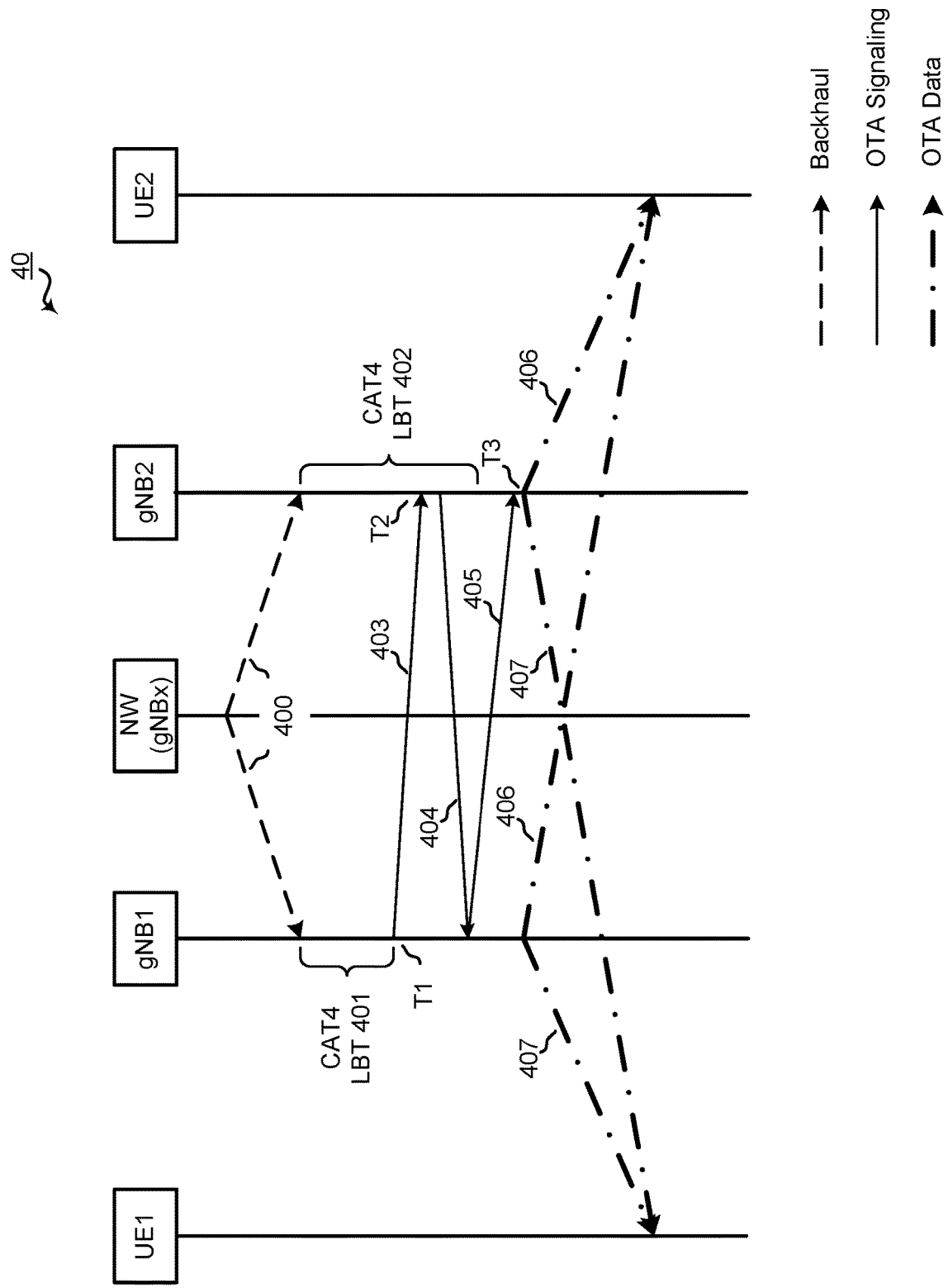
FIG. 4 is a block diagram illustrating a portion of a network configured to provide floating-instant CoMP operations according to prior suggested solutions.

FIG. 4 is a block diagram illustrating a portion of an NR-U network 40 configured to provide floating-instant CoMP operations according to prior suggested solutions. In such prior suggested solutions for providing floating-instant CoMP operations the network (NW) sends LBT trigger signals 400 triggering network nodes (gNB1 and gNB2) configured in a CoMP cluster to attempt access to the shared communication spectrum by performing full LBT procedure (e.g., Category 4 LBT). Accordingly, gNB1 performs CAT4 LBT 401 and gNB2 performs CAT4 LBT 402. This network signaling of LBT trigger signals 400 may be provided by the primary network node (gNBx) configured for the CoMP cluster. In such prior solutions, the first of the CoMP cluster network nodes (gNB1) to detect success of the full LBT procedure may then become the leading network node for the attempted CoMP operation. It should be noted that such leading network node (gNB1) may not be the primary network node (gNBx) in the CoMP cluster.

At time, T1, when gNB1 detects success of CAT4 LBT 401, gNB1, now the leading network node, sends an inquiry signal 403 to each of the other nodes scheduled for CoMP transmissions (e.g., gNB2). Inquiry signal 403 prompts the other CoMP cluster nodes (gNB2) to perform an abbreviated LBT procedure (CAT2 CCA) at time, T2. After gNB2 performs the CAT2 CCA, it will transmit CAT2 CCA report 404 with the results of the abbreviated LBT procedure back to gNB1. If gNB1 determines that sufficient other of the CoMP cluster network nodes have reported back a successful abbreviated LBT procedure, gNB1 would transmit a CoMP transmission trigger 405 to the other available CoMP cluster network nodes (gNB2) to begin joint CoMP transmissions at time, T3. In conducting the initial signaling to set up the CoMP operation, LBT trigger signals 400 may be communicated via backhaul to each of the other CoMP cluster network nodes, while inquiry signal 403, CAT2 CCA report 404, along with CoMP transmissions trigger 405 and joint CoMP data 406 and 407 may be communicated using over-the-air (OTA) transmissions.

While such prior suggested solutions allow for set-up of floating-instant CoMP operations in NR-U networks, the combination of signaling can be a challenge in areas where the shared communication spectrum co-exists with WiFi networks. Short signaling, such as the abbreviated LBT report (CAT2 CCA report 404) from gNB2 to gNB1 may be transmitted without an LBT procedure (e.g., Category 1 LBT). However, WiFi coexistence rules may force gNB2 to first perform another abbreviated LBT procedure (e.g., CAT2 CCA) before beginning its part of the joint CoMP transmission at T3. Thus, while gNB1 expects gNB2 to participate in joint CoMP transmissions, gNB2 may fail the abbreviated LBT procedure at T3 and, thus, be prevented from such joint CoMP transmissions. Alternatively, gNB2 could also fail to join the downlink CoMP joint transmissions if it fails to successfully decode the OTA CoMP transmission trigger 405.

Various aspects of the present disclosure are directed to an enhanced floating-instant CoMP operation model that provides an efficient and applicable operation to wireless communication networks that compete with other access technologies for access to the shared communication spectrum.

Figure 5A:
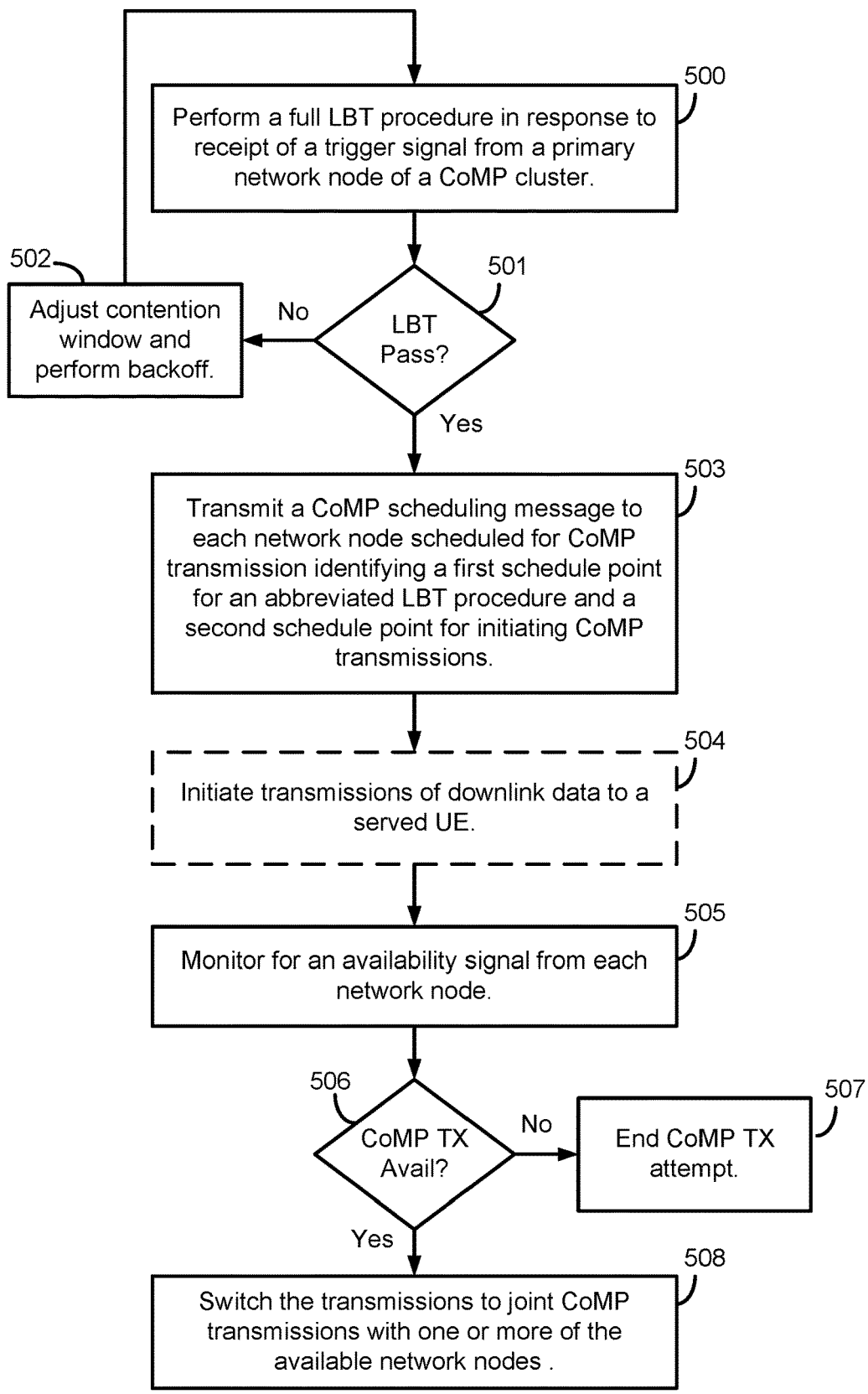
FIGS. 5A, 5B, and 5C are block diagrams illustrating example blocks executed to implement one aspect of the present disclosure.
Figure 12:
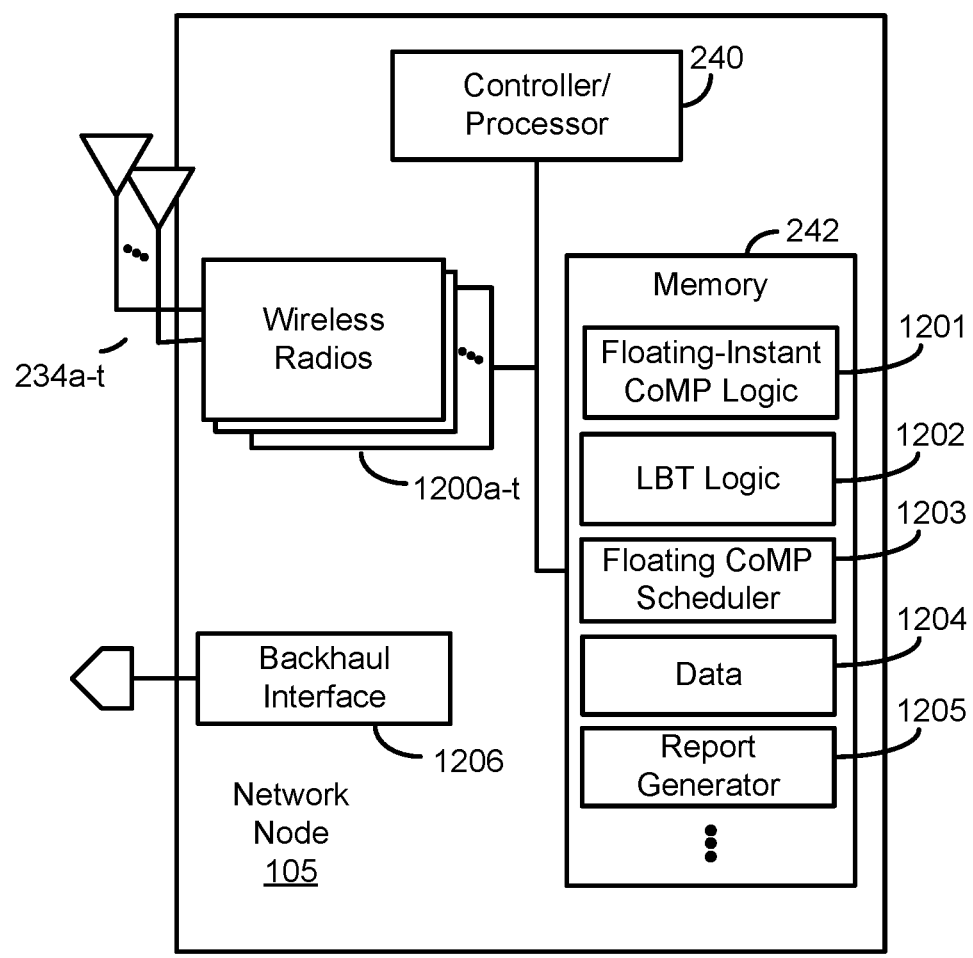
FIG. 12 is a block diagram illustrating a network node configured according to one aspect of the present disclosure.

FIG. 5A is a block diagram illustrating example blocks executed to implement one aspect of the present disclosure. The example blocks will also be described with respect to network node 105 as illustrated in FIG. 12. FIG. 12 is a block diagram illustrating network node 105 configured according to one aspect of the present disclosure. Network node 105 includes the structure, hardware, and components as illustrated for network node 105 of FIG. 2. For example, network node 105 includes controller/processor 240, which operates to execute logic or computer instructions stored in memory 242, as well as controlling the components of network node 105 that provide the features and functionality of network node 105. Network node 105, under control of controller/processor 240, transmits and receives signals via wireless radios 1200*a-t* and antennas 234*a-t*. Wireless radios 1200*a-t* includes various components and hardware, as illustrated in FIG. 2 for network node 105, including modulator/demodulators 232*a-t*, MIMO detector 236, receive processor 238, transmit processor 220, and TX MIMO processor 230.

At block 500, a network node performs a full LBT procedure on a shared communication channel in response to receipt of a trigger signal from a primary network node of a CoMP cluster configured including the network node and at least one neighboring network node. To initiate the floating-instant CoMP procedure, the network, via the primary network node configured for the CoMP cluster, sends LBT trigger signals over the backhaul to the other network nodes in the CoMP cluster. For example, in operating the floating-instant CoMP procedure, the primary network node, such as network node 105, executes, under control of controller/processor 240, floating-instant CoMP logic 1201, stored in memory 242. The execution environment of floating-instant CoMP logic 1201 provides network node 105 with the functionality and operations to recognize and perform floating-instant CoMP operations according to the various aspects of the present disclosure. Within the execution environment of floating-instant CoMP logic 1201 the LBT trigger signal may be sent via backhaul interface 1206 to the other network nodes in the CoMP cluster.

Each such cluster network node, including the primary network node, network node 105, then performs a full LBT procedure on the shared channel. For example, network node 105, under control of controller/processor 240, executes LBT logic 1202, stored in memory 242. The execution environment of LBT logic 1202 provides network node 105 the functionality to perform various types of LBT procedures. As called in response to the LBT trigger, network node 105, within the operation environment of LBT logic 1202, performs a full LBT procedure (e.g., CAT 4 LBT) on the shared communication channel.

At block 501, a determination is made by the network node whether the full LBT procedure is successful. For example, network node 105 monitors for signals or signal energy on the shared channel via antennas 234*a-t* and wireless radios 1200*a-t*. If energy above a certain level is detected or a preamble is detected, the LBT will fail. If the LBT is not successful, then, at block 502, the network node adjusts its contention window size and performs a backoff process before re-performing a full LBT procedure at block 500. Upon failing the full LBT procedure, network node 105 may update its contention window size (e.g., doubling the contention window size) and then select a new random number for a backoff process. After counting down the new random number, network node 105, within the execution environment of LBT logic 1202, may again restart the floating-instant CoMP attempt by performing another full LBT procedure.

Otherwise, if the network node detects a successful LBT procedure at block 501, then, at block 503, the network node initiates transmissions of downlink data to a served UE and, at block 504, transmits a CoMP scheduling message to each network node scheduled for CoMP transmission, wherein the CoMP scheduling message identifies a first schedule point for the network nodes to perform an abbreviated LBT procedure on the shared communication channel and a second schedule point for initiating CoMP transmissions. If no signal energy above the threshold level or preambles are detected by network node 105, the full LBT procedure will succeed. As the first network node to detect success of the full LBT procedure, the execution environment of floating-instant CoMP logic 1201 provides that network node 105 becomes the leading network node for the CoMP transmission attempt. According to the illustrated aspect, network node 105 begins a first phase of the floating-instant CoMP when the successful full LBT is detected by starting single downlink transmissions to a served UE. The first phase of the floating-instant CoMP operation provides for network node 105 to send data 1204 directly to a served UE via wireless radios 1200*a-t* and antennas 234*a-t*.

At the same time, this leading network node, network node 105, may send a CoMP scheduling message to the other network nodes scheduled for CoMP transmissions. For example, network node 105, under control of controller/processor 240, executes floating CoMP scheduler 1203, stored in memory 242. The execution environment of floating CoMP scheduler 1203, operating in conjunction with the functionality provided within the execution environment of floating-instant CoMP logic 1201, generates and sends a CoMP scheduling message via wireless radios 1200a-t and antennas 234a-t. These transmissions by the leading network node, network node 105, occupy the shared channel after clearing the LBT. The CoMP scheduling message identifies a first time for the node to perform an abbreviated LBT procedure (e.g., CAT2 LBT) on the shared channel and a second time for the node to begin joint CoMP transmissions if available.

At block 505, the network node monitors for an availability signal from the each network node reporting results of the abbreviated LBT procedure. As the nodes receiving the CoMP scheduling message from the leading network node, network node 105, perform the abbreviated LBT procedure on the shared channel, they will each send an availability signal back to the leading network node to indicate whether or not the node is available for the CoMP transmissions. The leading network node, network node 105, monitors backhaul interface 1206 for these availability signals.

At block 506, a determination is made by the network node whether joint CoMP transmission is available. The determination by network node 105 may be made based on whether a sufficient number of network nodes respond with the availability signal indicating it is available for transmissions. The number of nodes that are sufficient may be provided within the execution environment of floating-instant CoMP logic 1201. If the leading network node, network node 105, determines that joint CoMP transmissions are not available, then, at block 507, network node 105 signals the other nodes in the CoMP cluster either via backhaul interface 1206 or OTA via wireless radios 1200a-t and antennas 234a-t to end the current attempt for joint CoMP transmissions.

Otherwise, if network node 105 determines that joint CoMP transmission is available, then, at block 508, the leading network node switches the downlink transmissions from the single transmissions to joint CoMP transmissions with one or more of the available network nodes. The switch to the joint CoMP downlink transmissions moves the CoMP cluster to phase two of the floating-instant CoMP operation according to the various aspects described herein. In phase two, network node 105 along with the other network nodes in the CoMP cluster that sent availability signals jointly transmit data 1204 to served UEs in a joint CoMP transmission.

In making the determination of whether CoMP transmission is available, the leading network node, network node 105, may, within the execution environment of floating-instant CoMP logic 1201, determine whether all or a subset of the other nodes scheduled for CoMP transmissions are available. Where a subset of nodes sends availability signals indicating those nodes are available for CoMP transmissions, the leading network node, network node 105, will determine availability or not depending on whether the network allows incomplete CoMP transmissions, in which less than the full number of nodes configured for CoMP are available for joint CoMP transmissions. If the network does not allow incomplete CoMP transmissions, the leading network node, network node 105, will determine CoMP transmissions are available where all of the scheduled nodes transmit positive availability signals and will determine CoMP transmissions are unavailable where some but not all of the scheduled nodes transmit positive availability signals.

In contrast, if the network allows for incomplete CoMP transmissions, the leading network node, network node 105, will determine CoMP transmissions are available when all or a sufficient number of nodes indicates their availability for transmissions and will determine CoMP transmissions are not available when less than the threshold number of network nodes indicates their availability.

Figure 5B:
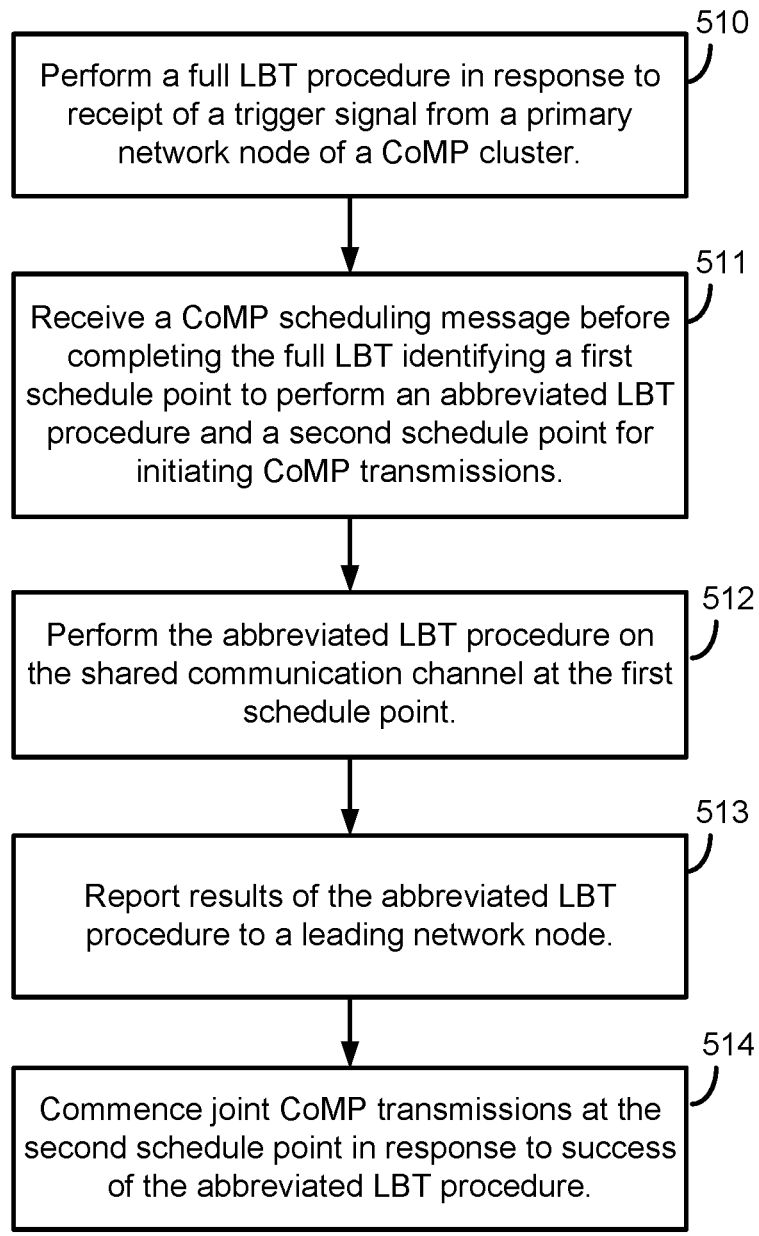

FIG. 5B is a block diagram illustrating example blocks executed to implement one aspect of the present disclosure. The example blocks will also be described with respect to network node 105 as illustrated in FIG. 12. As described with respect to FIG. 5B, network node 105 represents the non-leading network nodes in the CoMP cluster executing floating-instant CoMP operations according to the present disclosure.

At block 510, similar to the network node action at block 500 of FIG. 5A, a network node performs a full LBT procedure on a shared communication channel in response to receipt of a trigger signal from a primary network node of a CoMP cluster including the network node. As noted above, the network, via the primary network node, initiates the floating-instant CoMP procedure by sending LBT trigger signals over the backhaul to the other network nodes in the CoMP cluster, which then perform a full LBT procedure on the shared channel. In operating the floating-instant CoMP procedure, network node 105, executes, under control of controller/processor 240, floating-instant CoMP logic 1201, stored in memory 242. The execution environment of floating-instant CoMP logic 1201 provides network node 105 with the functionality and operations to recognize and perform floating-instant CoMP operations according to the aspects of the present disclosure. For example, in response to receiving the LBT trigger, network node 105, under control of controller/processor 240, executes LBT logic 1202, stored in memory 242. The execution environment of LBT logic 1202 provides network node 105 the functionality to perform LBT procedures. In response to the LBT trigger, network node 105, within the operation environment of LBT logic 1202, performs a full LBT procedure (e.g., CAT 4 LBT) on the shared communication channel.

At block 511, before completing the full LBT procedure, the network node receives a CoMP scheduling message from a leading network node of the CoMP cluster, wherein the CoMP scheduling message identifies a first schedule point for the network node to perform an abbreviated LBT procedure and a second schedule point for initiating CoMP transmissions. According to the aspect illustrated in FIG. 5B, the subject network node, network node 105, is not the first to detect a successful LBT. Instead, before completing the full LBT procedure, network node 105 receives a CoMP scheduling message from the leading network node via antennas 234a-t and wireless radios 1200a-t. The CoMP scheduling message, which may be sent with a downlink control information (DCI) message, includes scheduling for the non-leading network node, network node 105, to perform an abbreviated LBT procedure (e.g., CAT2 LBT) and also provides scheduling for when the non-leading network node, network node 105, can begin joint CoMP transmissions.

At block 512, the network node performs the abbreviated LBT procedure on the shared communication channel at the first schedule point. With the leading network node passing the full LBT procedure, it may share its channel occupancy time (COT) with the other nodes of the CoMP cluster. With the leading network node occupying the shared channel with the transmissions of the downlink data and the CoMP scheduling message, the non-leading network node, network node 105, may not require a full LBT procedure before transmitting downlink data to its own served UE. Thus, network node 105, under control of controller/processor 240, executed LBT logic 1202, stored in memory 242. Within the execution environments of floating-instant CoMP logic 1201 and LBT logic 1202, network node 105 will know to perform an abbreviated LBT procedure (e.g., CAT 2 LBT) at the first schedule point in response to receiving the CoMP scheduling message. If the abbreviated LBT procedure is successful, as a part of phase one of the floating-instant CoMP operation of the present disclosure, the non-leading network node, network node 105, will begin single downlink transmissions of data 1205 to its served UEs via wireless radios 1200a-t and antennas 234a-t.

At block 513, the network node reports results of the abbreviated LBT procedure to the leading network node. Further in response to detecting a result of the abbreviated LBT procedure, the non-leading network node, network node 105, under control of controller/processor 240, executes report generator logic 1205, stored in memory 242. The execution environment of report generator logic 1205, allows network node 105 to generate a report that identifies the results of the abbreviated LBT procedure. Network node 105 may then send the report via backhaul interface 1206 to the leading network node identifying such results. The results represent an availability of the non-leading network node to participate in the scheduled CoMP transmission.

At block 514, the network node commences joint CoMP transmissions with the leading network node at the second schedule point in response to success of the abbreviated LBT procedure. The non-leading network node, network node 105, received the second schedule point for when to begin the joint CoMP transmission with the CoMP scheduling message via antennas 234a-t and wireless radios 1200a-t. After successfully completing the abbreviated LBT procedure, signaling the results in a report to the leading network node, and transmitting downlink data 1204 to a served UE after the successful abbreviated LBT procedure, the non-leading network node, network node 105, will, within the execution environment of floating-instant CoMP logic 1201, begin the joint CoMP transmissions along with the other available nodes of the CoMP cluster at the second schedule point from the CoMP scheduling message.

It should be noted that, where the leading node determines, based on the availability signals received from the non-leading nodes, including network node 105, that CoMP transmissions are not available, the leading network node may signal the non-leading nodes to abandon the current CoMP transmissions attempt. Otherwise, as noted above, the non-leading node, network node 105, transitions to phase two of the floating-instant CoMP operations with the joint CoMP transmissions.

Figure 5C:
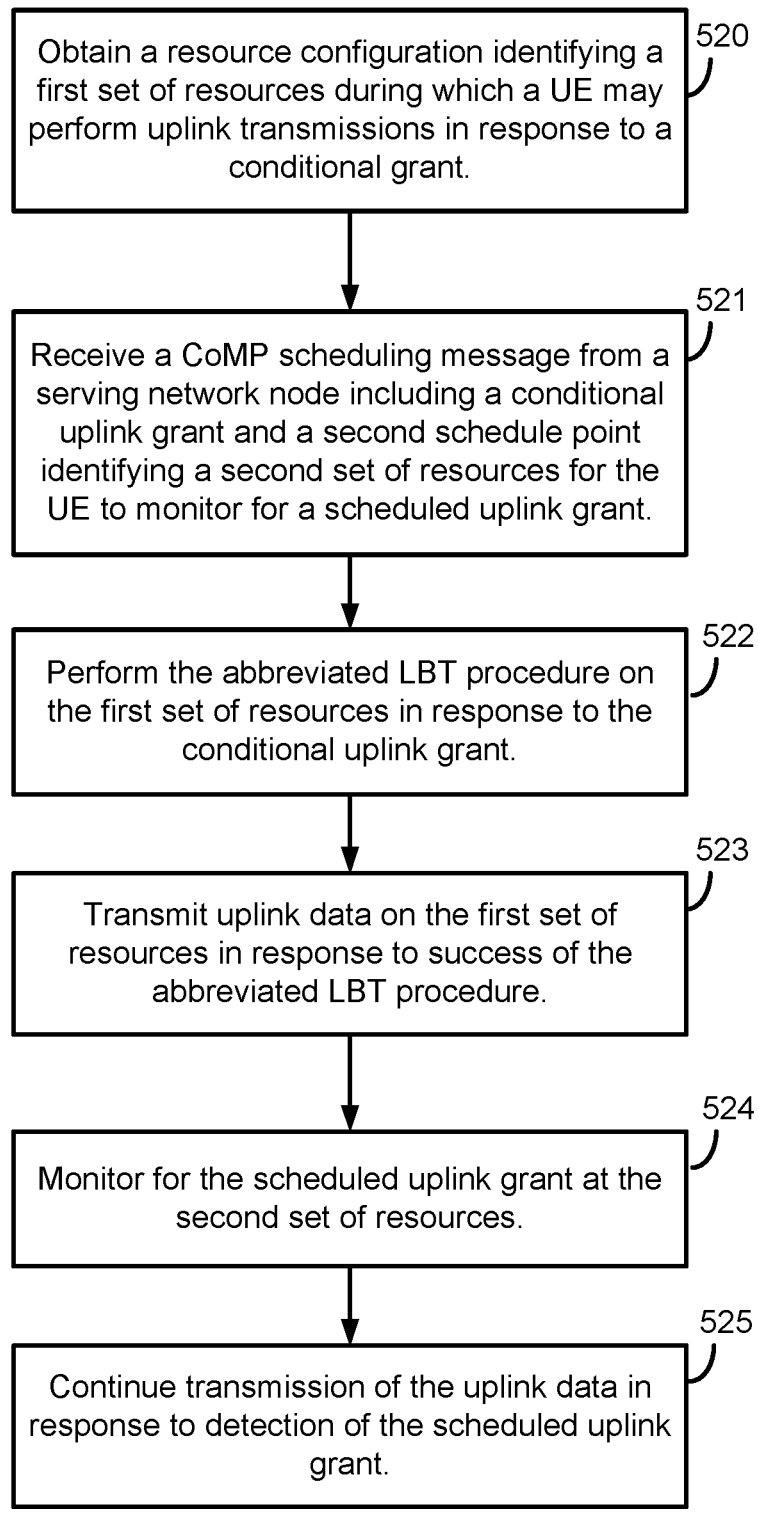
Figure 13:
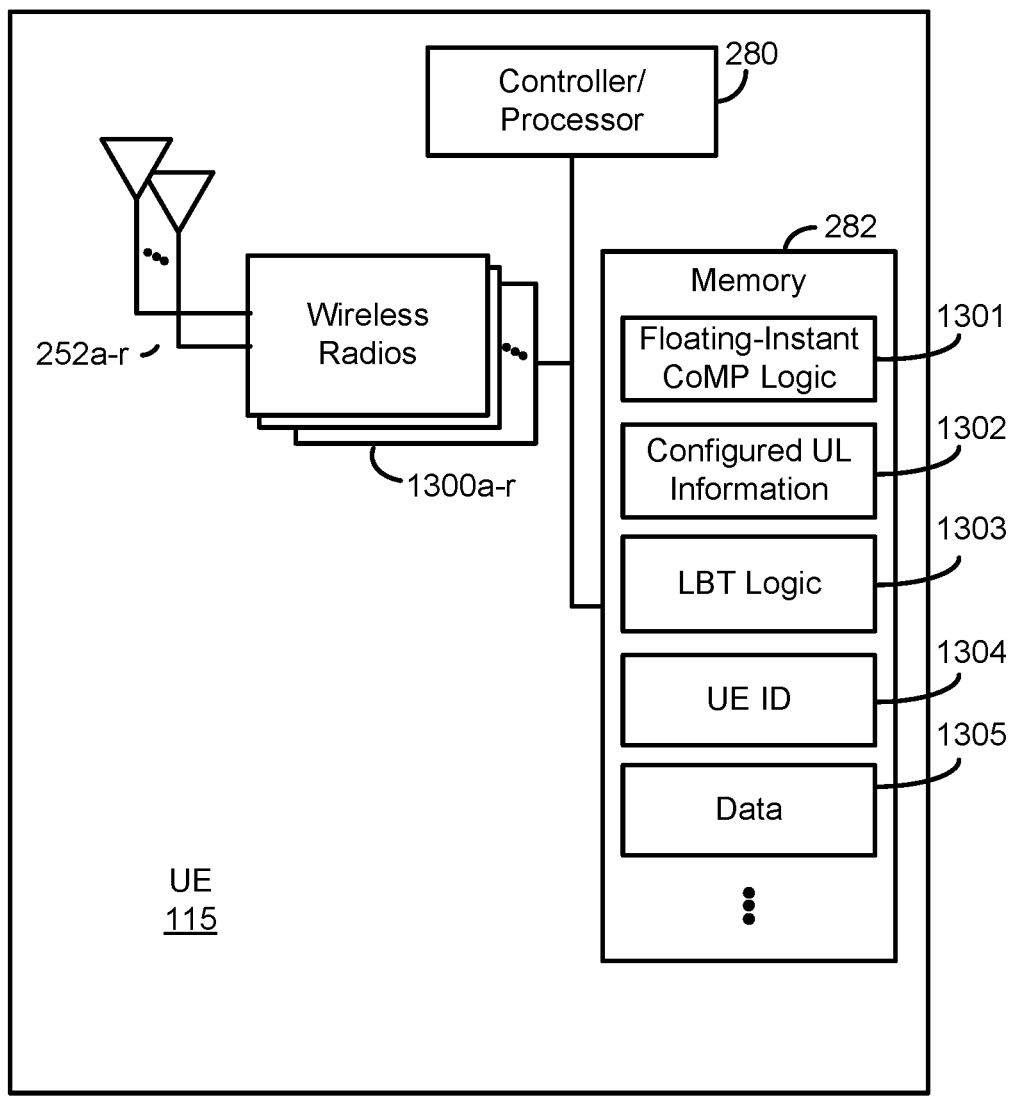
FIG. 13 is a block diagram illustrating a UE configured according to one aspect of the present disclosure.

FIG. 5C is a block diagram illustrating example blocks executed to implement one aspect of the present disclosure. The example blocks will also be described with respect to UE 115 as illustrated in FIG. 13. FIG. 13 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1300a-r and antennas 252a-r. Wireless radios 1300a-r includes various components and hardware, as illustrated in FIG. 2 for UE 115, including modulator/demodulators 254a-r, MIMO detector 256, receive processor 258, transmit processor 264, and TX MIMO processor 266.

At block 520, a UE, such as UE 115, obtains a configured uplink grant identifying a set of resources during which the UE may perform uplink transmissions without an uplink grant, wherein the set of resources are shared between one or more additional UEs. In networks that support autonomous or configured uplink transmissions, UEs, such as UE 115, obtain pre-configuration information on a set of uplink resource available for configured uplink transmissions. Such pre-configuration information may be stored in memory 282 at configured uplink information 1302.

At block 521, the UE receives a CoMP scheduling message from a serving network node, wherein the CoMP scheduling message includes a conditional uplink grant and second schedule point identifying a second set of resources for the UE to monitor for a scheduled uplink grant. In operating floating-instant CoMP operations, the UE, such as UE 115, executes, under control of controller/processor 280, floating-instant CoMP logic 1301, stored in memory 282. The execution environment of floating-instant CoMP logic 1301 provides UE 115 with the functionality and operations to recognize and perform floating-instant CoMP operations according to the various aspects of the present disclosure. Within the execution environment of floating-instant CoMP logic 1301, UE 115 recognizes the CoMP scheduling message as providing the scheduling point/conditional uplink grant for UE 115 to perform the abbreviated LBT at that first scheduling point and as providing a second schedule point that identifies the second set of resources for UE 115 to monitor for a scheduled uplink grant. The scheduled uplink grant, if received, will allocate scheduled resources for UE 115 to further conduct the uplink transmissions.

At block 522, the UE performs an abbreviated LBT procedure on the first set of resources in response to the conditional uplink grant. For example, UE 115, under control of controller/processor 280, executes LBT logic 1303, stored in memory 282. The execution environment of LBT logic 1303 provides UE 115 the functionality to perform various types of LBT procedures. As called in the operation of floating-instant CoMP in response to the conditional uplink grant, UE 115, within the operation environment of LBT logic 1303, performs an abbreviated LBT procedure (e.g., CAT 2 LBT) on the shared communication channel. Here, as the leading network node has secured a COT via a successful full LBT procedure, UE 115 scheduled for uplink CoMP transmissions may share the leading network node's COT. As such, when attempting access to the set of resources of the shared channel, UE 115 may obtain access using the reduced, abbreviated LBT procedure.

At block 523, the UE transmits uplink data on the first set of resources in response to success of the abbreviated LBT procedure a determination is made by the UE whether the full LBT procedure is successful. For example, UE 115 monitors for signals or signal energy on the shared channel via antennas 252a-r and wireless radios 1300a-r. If only energy below a certain threshold level is detected and no preamble is detected, the LBT will pass. Upon detecting such successful abbreviated LBT, UE 115 will transmit data 1305 via wireless radios 1300a-r and antennas 252a-r to a serving network node of the CoMP cluster. Otherwise, if the LBT is not successful, UE 115 will not transmit.

At block 524, the UE monitors the second schedule point for the scheduled uplink grant at the second set of resources. For example, UE 115 monitors signals at the second schedule point via antennas 252a-r and wireless radios 1300a-r to determine whether it receives an scheduled uplink grant from the leading network node. The leading network node serving UE 115 may make a determination to send the scheduled uplink grant based on whether a sufficient number of UEs have begun transmitting uplink data on the configured set of resources, evidencing success of the abbreviated LBT procedures. The number of UEs that would be sufficient may be provided within the execution environment of floating-instant CoMP logic 1301. If the leading network node determines that uplink CoMP transmissions are not available, it will not send the scheduled uplink grant. Otherwise, the scheduled uplink grant is transmitted to each UE that has begun transmitting data. UE 115 transmits data 1305 on the set of allocated resources identified in the scheduled uplink grant.

At block 525, the UE continues transmission of the uplink data in response to detection of the scheduled uplink grant, wherein the uplink data is transmitted on an allocated set of resources assigned in the scheduled uplink grant. If the leading network node has determined that uplink CoMP transmissions may occur and has sent the scheduled uplink grant during the second schedule point, UE 115 continues transmitting data 1305 to a serving network node of the CoMP cluster via wireless radios 1300*a-r* and antennas 252*a-r*.

Figure 6A:
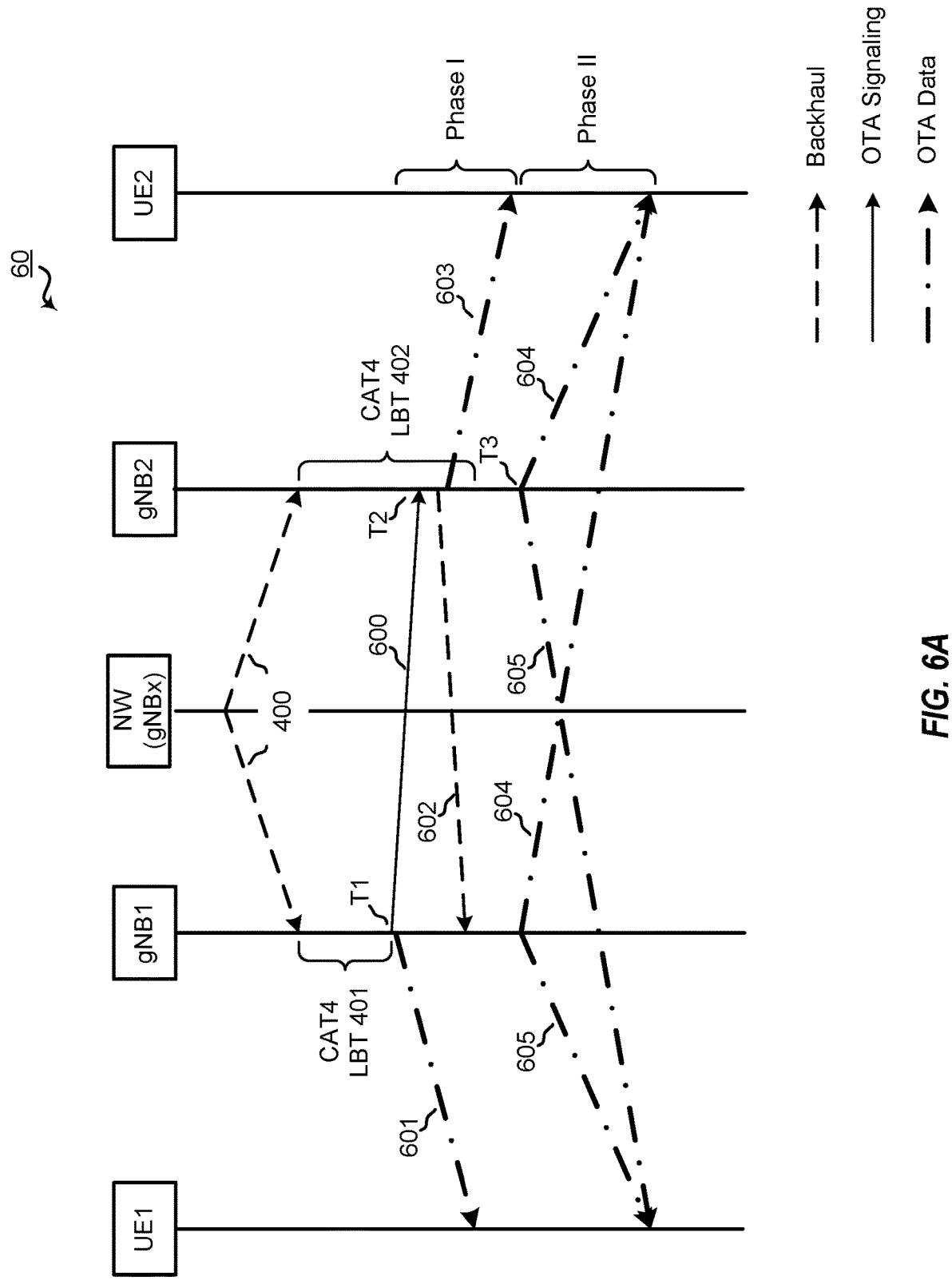
FIGS. 6A and 6B are block diagrams illustrating a portion of a network having a CoMP cluster of network nodes configured according to one aspect of the present disclosure.

FIG. 6A is a block diagram illustrating a portion of NR-U network 60 having a CoMP cluster of gNB1, gNB2, and gNBx configured according to one aspect of the present disclosure. The network, NW, the signaling of which may be delivered from a primary network node, gNBx, configures a CoMP cluster to include gNB1 and gNB2. The primary network node, gNBx, may be implemented as gNB1, gNB2, or a third gNB of the cluster. For purposes of describing the example aspect illustrated in FIG. 6, the network, NW, will be described as communicating with the other network nodes of the CoMP cluster, gNB1 and gNB2.

The floating-instant CoMP operation according to the illustrated aspect may be initiated in a similar manner as depicted in FIG. 4 above by NW sending LBT trigger signals 400 over the backhaul to gNB1 and gNB2. LBT trigger signals 400 trigger each of gNB1 and gNB2 to perform full LBT procedures, CAT4 LBT 401 and 402, respectively, for attempted access to a shared communication channel. At time, T1, gNB1 detects success of CAT4 LBT 401 and initiates phase one of the floating-instant CoMP operation. In phase one, gNB1 transmits data 601 in a single downlink transmission to a served UE, UE1, and sends a CoMP scheduling message 600 to gNB2, both transmitted OTA.

CoMP scheduling message 600 includes scheduling of two events. The first event, performance of the abbreviated LBT procedure, is scheduled for time, T2, and the second event, initiation of phase two, the joint CoMP transmission, is scheduled for time, T3. At time, T2, gNB2 performs the abbreviated LBT procedure, and, if successful, transmits data 603 in a single downlink transmission to its served UE, UE2, and sends availability signal 602 via backhaul to the leading network node, gNB1. Therefore, in phase one of the floating-instant CoMP operation according to aspects of the present disclosure, each network node of the cluster, gNB1 and gNB2, conducts single downlink transmissions to each respective served UE, UE1 and UE2, respectively.

At time, T3, phase two of the floating-instant CoMP operation according to the aspects of the present disclosure is initiated. CoMP scheduling message 600 schedules the network nodes of the CoMP cluster, gNB1 and gNB2, for joint downlink CoMP transmissions. gNB1 and gNB2 jointly transmit data 604 to UE 2 and jointly transmit data 605 to UE1. However, phase two may not be initiated by the leading network node, gNB1, without first confirming the requisite presence of multiple available nodes from phase one. The rules of NR-U network 60 may allow incomplete CoMP transmissions or not. As noted above, incomplete CoMP transmissions occur when fewer than the total number of nodes of a CoMP cluster are available to transmit. Some networks may be set to allow a certain level of incomplete CoMP transmissions. For example, incomplete CoMP transmissions may be allowed if the incomplete CoMP lacks only a threshold number or percentage of cluster nodes. Where greater than the threshold number of unavailable cluster nodes are not available for transmission, the leading network node, gNB1, may determine that joint CoMP transmissions should not be made and stop the transition between phases one and two of the floating-instant CoMP operation. In such case, the leading network node may signal the other cluster network nodes via the backhaul that the CoMP transmission attempt should end.

The OTA signaling of data 601 and CoMP scheduling message 600 allows gNB1 to immediately occupy the shared medium. In contrast, backhaul signaling is used for the non-leading network nodes (gNB2) to communicate the availability signal. Backhaul hand-shaking can be implemented to increase the reliability of such communications. Thus, the switching to phase two may be enabled through backhaul negotiation based on the availability signaling.

According to selected aspects, once the network sends the LBT trigger signals, the network nodes of the CoMP cluster will continue conducting full LBT procedures until any kind of pending transmission is completed. Thus, such a network node may retry new full LBT procedures until the CoMP transmission is done. For example, in networks that do not allow for incomplete CoMP transmissions, every time the leading network node clears the full LBT but not all of the non-leading network nodes clear the abbreviated LBT, the leading network node will stop the current attempt and then retry the full LBT. This type of operation may unfairly cause extended interference or competition for the shared medium with different CoMP clusters from the same or different network operators.

Figure 6B:
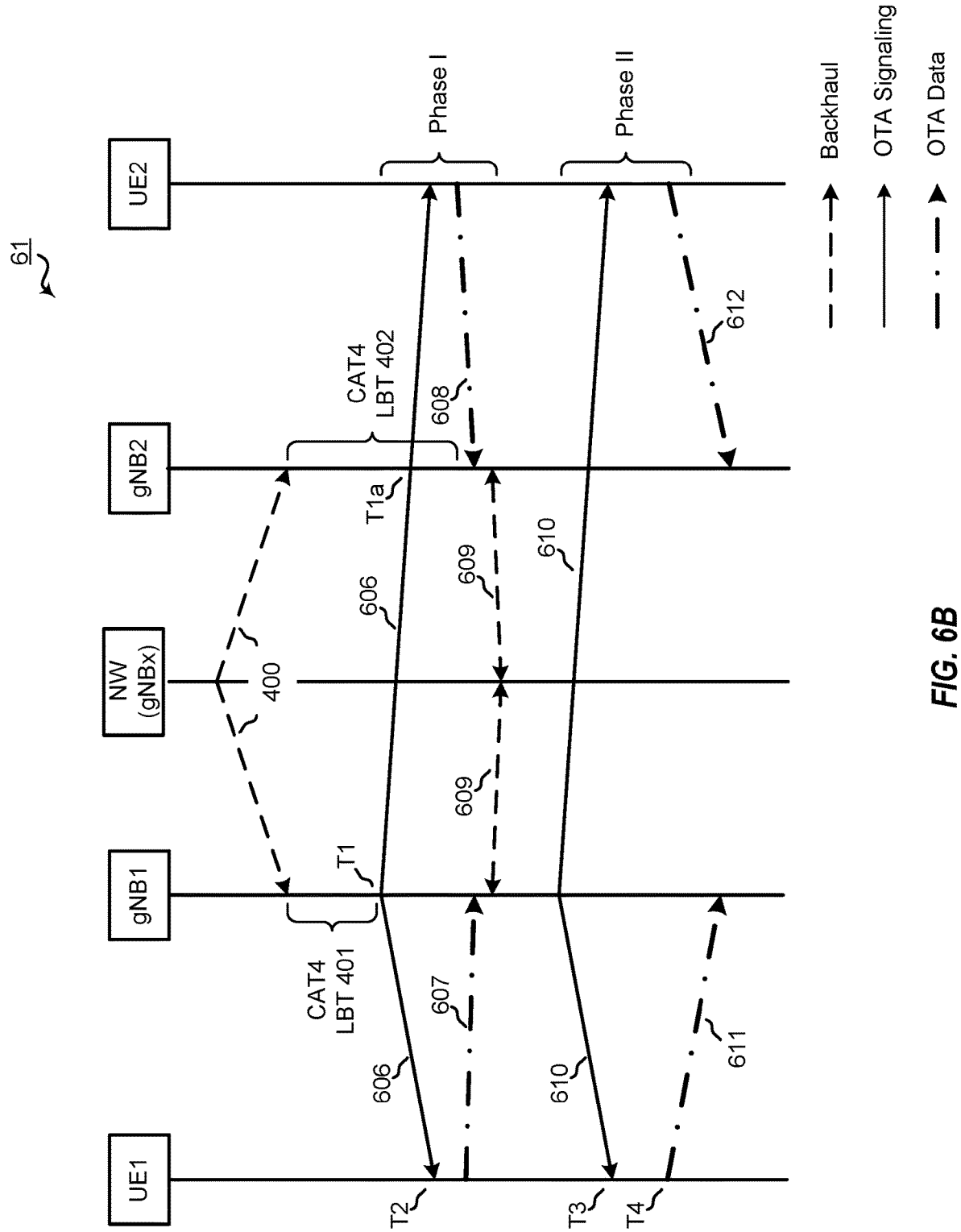

FIG. 6B is a block diagram illustrating a portion of NR-U network 61 having a CoMP cluster of gNB1, gNB2, and gNBx configured according to one aspect of the present disclosure. As described with respect to FIG. 6A, the network, NW, signaling may be delivered from a primary network node, gNBx, and configures a CoMP cluster to include gNB1 and gNB2. The primary network node, gNBx, may be implemented as gNB1, gNB2, or a third gNB of the cluster. For purposes of describing the example aspect illustrated in FIG. 6B, the network, NW, will be described as communicating with the other network nodes of the CoMP cluster, gNB1 and gNB2.

The floating-instant CoMP operation according to the illustrated aspect may be initiated in a similar manner as depicted in FIGS. 4 and 6A above by NW sending LBT trigger signals 400 over the backhaul to gNB1 and gNB2. LBT trigger signals 400 trigger each of gNB1 and gNB2 to perform full LBT procedures, CAT4 LBT 401 and 402, respectively, for attempted access to a shared communication channel. At time, T1, gNB1 detects success of CAT4 LBT 401 and initiates phase one of the floating-instant uplink CoMP operation.

gNB1 recognizes that UE1 and UE2 are scheduled for uplink CoMP transmissions. Therefore, gNB1 transmits an uplink CoMP scheduling message 606 to UE1 and UE2. The uplink CoMP scheduling message 606 includes a first schedule point represented by a conditional grant for UE1 and UE2 to perform an abbreviated LBT procedure at a set of configured resources along with a second schedule point identifying a second set of resources at which UE1 and UE2 should monitor for a full scheduled uplink grant. At time, T1a, gNB2 detects uplink CoMP scheduling message 606 and understands that the CoMP attempt will be reserved for UE1 and UE2 to perform uplink CoMP transmissions. Accordingly, gNB2 ceases CAT4 LBT 402 and begins monitoring for uplink data transmitted by UE1 and UE2.

The set of configured resources occur at time, T2. Thus, at T2, UE1 and UE2 perform an abbreviated LBT procedure (e.g., CAT2 LBT). If the abbreviated LBT procedure is successful, UE1 begins transmitting uplink data 607 to its serving network node, gNB1, while UE2 begins transmitting uplink data 608 to its serving network node, gNB2. gNB1 and gNB2 exchange signaling identifying that uplink data from UE1 and UE2 has been received and, thus, UE1 and UE2 are available for continued uplink CoMP transmissions. After transmitting uplink data 607 and 608, UE1 and UE2 will then monitor the second set of resources for a full scheduled uplink grant.

The leading network node, gNB1, uses the information on which UEs have transmitted uplink data and are available for uplink CoMP transmissions to determine whether to authorize continued uplink transmissions. If UE1 and UE2 do not represent all of the UEs configured for uplink CoMP transmissions, gNB1 may determine whether the rules of NW allow for incomplete uplink CoMP transmissions. If not, then gNB1 will determine that continued uplink transmission, uplink CoMP, should not be allowed and will not transmit the scheduled uplink grant at the second set of resources. However, if UE1 and UE2 are all of the UEs scheduled for uplink CoMP transmissions or NW allows incomplete CoMP transmissions with two UEs, then gNB1 transmits scheduled uplink grant 612 to UE1 and UE2. The transmission of scheduled uplink grant 612, received by UE1 and UE2 at T3, will begin phase two of the floating-instant uplink CoMP operations. Scheduled uplink grant 612 allocates at set of scheduled resources at time, T4, for UE1 and UE2 to continue transmission of the uplink data.

Figure 7:
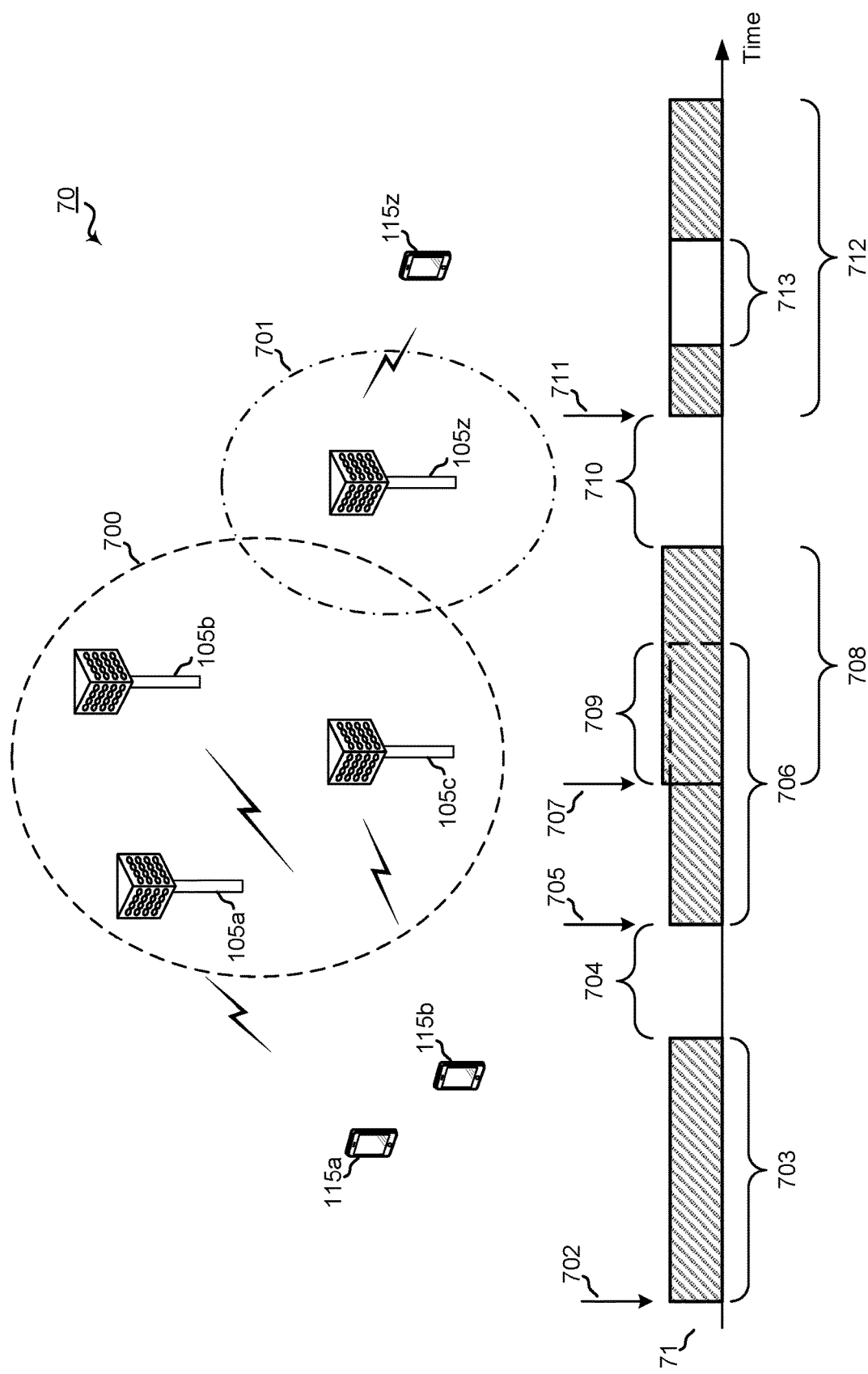
FIG. 7 is a block diagram illustrating a portion of a network having network nodes and UEs participating in floating-instant CoMP operations according to one aspect of the present disclosure.

FIG. 7 is a block diagram illustrating a portion of NR-U network 70 having network nodes 105a-105c and UEs 115a-115b participating in floating-instant CoMP operations according to one aspect of the present disclosure. Network nodes 105a-105c are configured to operate as a CoMP cluster 700. Network nodes 105a-105c serve UEs 115a-115b according to a first network operator. Network node 105z operates by itself or as a part of CoMP cluster 701 and serves UE 115z according to a second network operator. If network nodes 115a-115c of CoMP cluster 700 operated under the continuous CoMP attempt scenario described above, network node 105z would experience an unfair level of interference or competition for access to shared communication channel 71.

According to the example aspect illustrated in FIG. 7, NR-U network 70 defines an LBT trigger window (LBT trigger windows 703, 706, 708, 712) during which the current LBT trigger is valid. For example, NR-U network 70 sends LBT trigger signal 702 via the primary network node, network node 105a, of CoMP cluster 700. The CoMP transmission attempt triggered via LBT trigger signal 702 is valid only for the duration of LBT trigger window 703. Should the CoMP attempt fail during LBT trigger window 703, the leading network node will retry the full LBT procedure in order to re-attempt the CoMP transmission process. However, at the end time of LBT trigger window, there will be no further retries under LBT trigger signal 702. Open windows 704 and 710 before successive LBT trigger signals 705 and 711 allow for less competition for shared communication channel 71 for network node 105z and may provide for a more fair coexistence between the first and second network operators.

In additional aspects, NR-U network 70 may be configured to issue a new LBT trigger to replace or override a current LBT trigger. For example, via the primary network node, network node 105a, NR-U network 70 sends LBT trigger signal 705 defining LBT trigger window 706. However, NR-U network 70 may send LBT trigger signal 707 to replace LBT trigger signal 705. The result of the replacement LBT trigger would invalidate LBT trigger signal 705 before its end time in order to activate the new LBT trigger window 708. Thus, the remaining period 709 of LBT trigger window 706 will no longer be valid. In one example implementation, each trigger signal may be assigned a time sequence that can be used to differentiate active trigger signals from inactive or superseded trigger signals.

It should be noted that in one example scenario, NR-U network 70 may detect an increase in downlink data traffic for CoMP cluster 700. The detected increase may cause NR-U network 70 to increase the time during which CoMP cluster 700 should attempt joint CoMP transmissions. Accordingly, NR-U network 70 issues LBT trigger signal 707 to override LBT trigger signal 705 in order to provide a longer total duration for CoMP transmission attempts.

In an additional example aspect illustrated in FIG. 7, an LBT trigger window may further be defined to include inactive zones during which some or all of the network nodes within CoMP cluster 700 are either prohibited or de-prioritized for attempting CoMP transmissions according to the floating-instant CoMP operation. In operation, NR-U network 70, via the primary network node, network node 105a, of CoMP cluster 700 sends LBT trigger signal 711. LBT trigger signal 711 not only defines the starting and ending points of LBT trigger window 712, but also defines inactivity zone 713 within LBT trigger window 712.

The actions available to network nodes 105a-105c during inactivity zone 713 may vary depending on the configuration of NR-U network 70 or may be based on traffic or activity on shared communication channel 71. In one example implementation, one or more of network nodes 105a-105c may be prohibited from conducting a full LBT for CoMP transmissions during inactivity zone 713. In an another example implementation, one or more of network nodes 105a-105c may be configured to be less aggressive in attempting access to shared communication channel 71. For example, during inactivity zone 713, the minimum contention window size for network nodes 105a-105c may be reconfigured to a relatively large number. The number would be large enough to increase the back-off period which would reduce the probable access attempts during inactivity zone 713.

In one example implementation of such described aspect, each of network nodes 105a-105c may be assigned a priority. The value of the reconfigured minimum contention window size would be associated with the priority level of the network node. Thus, a higher priority network node would not be reconfigured with as high a minimum contention window size as a lower priority network node. The resulting operation would still provide a less aggressive competition for shared communication channel 71, which may allow network node 105z of the second network operator more opportunity for access or may allow UEs 115a-115b to initiate uplink transmissions or uplink CoMP operations.

With reference to the prior suggested solutions for floating-instant CoMP operations, the accompanying designs for contention window update offered a simple process. The leading network node would double its contention window size and retry the full LBT whenever CoMP transmissions could not be arranged as initiated by the LBT trigger (e.g., failure based on incomplete CoMP conditions). Similarly, after CoMP transmission and reception, each of the network nodes within the CoMP cluster would update their respective contention window sizes by following existing license assisted access (LAA) rules, which base the update to the contention window size on the acknowledgment information of its individual served UE(s). Various aspect of the present disclosure may be directed to an alternative design for contention window update.

Figure 8:
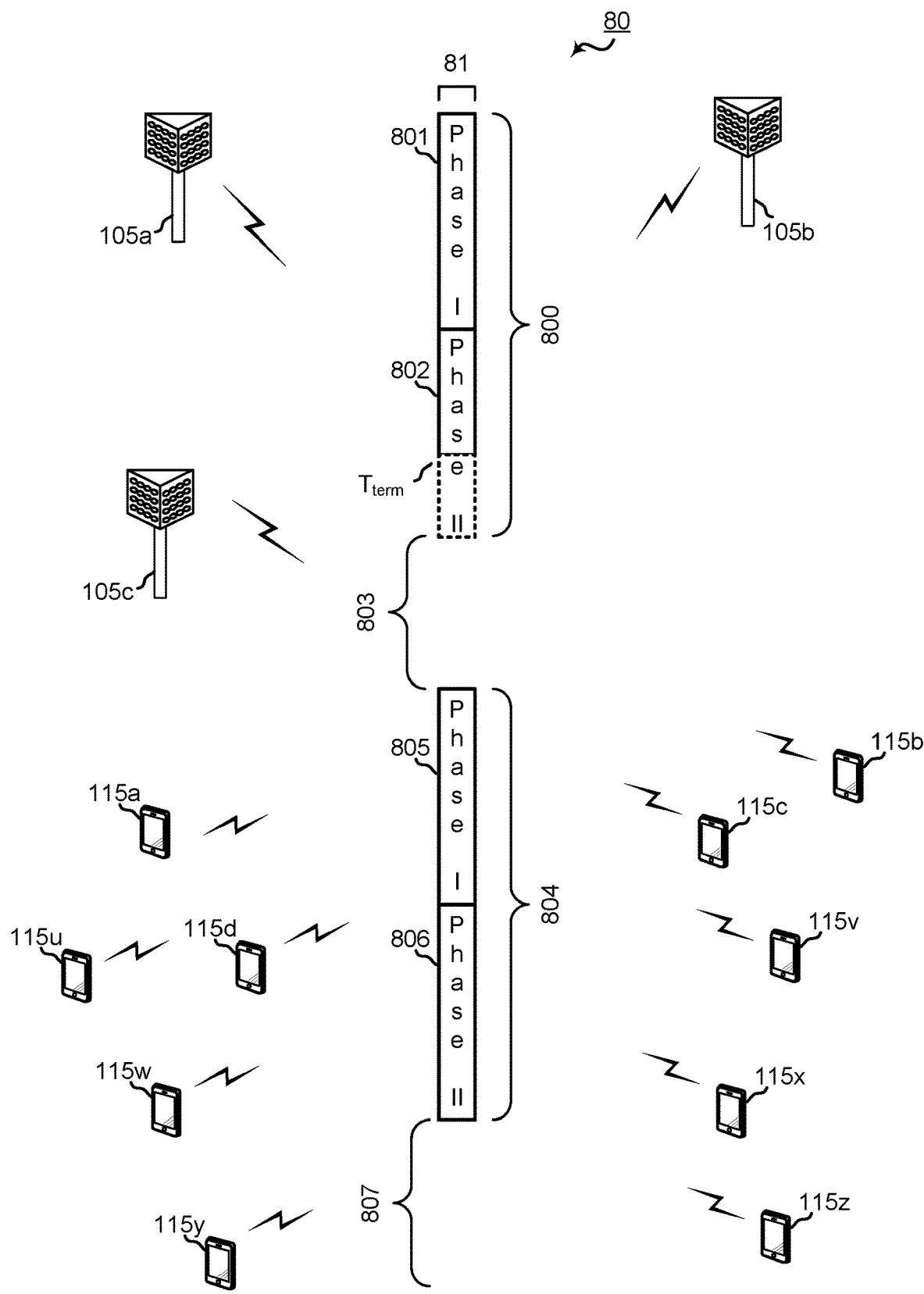
FIG. 8 is a block diagram illustrating a portion of a network having network nodes configured for floating-instant CoMP operations according to one aspect of the present disclosure.

FIG. 8 is a block diagram illustrating a portion of NR-U network 80 having network nodes 105a-105c configured for floating-instant CoMP operations according to one aspect of the present disclosure. Network nodes 105a-105c are configured in a CoMP cluster and serve UEs 115a-115d and 115u-115z using shared communication channel 81. In a first floating-instant CoMP operation 800, phase one 801 is completed with the leading network node, network node 105b, successfully sending CoMP scheduling messages to each of network nodes 105a and 105c, where each of network nodes 105a-105c conduct single downlink transmissions with respective served UEs (one or more of UEs 115a-115d and 115u-115z). However, during phase two 802, joint CoMP transmissions terminate early at time, $T_{term}$. In response to the early termination of phase two 802, the leading network node, network node 105b, within region 803, doubles its contention window size and retries the full LBT procedure for another floating-instant CoMP attempt.

In a next floating-instant CoMP operation 804, phase one 805 is successfully completed, and phase two 806 is successfully completed the joint CoMP transmissions to the various served UEs, UEs 115a-115d and 115u-115z. Instead of each of network nodes 105a-105c attending to its own contention widow size individually, aspects of the present disclosure provide for the leading network node, network node 105b, to maintain its contention window size according to the overall collision status within the CoMP cluster. For example, during region 807 after successful completion of the transmissions of next floating-instant CoMP operation 804, the leading network node, network node 105b, monitors the acknowledgement feedback signaling (e.g. hybrid automatic repeat request (HARQ) feedback) from UEs 115a-115d and 115u-115z. By identifying the negative acknowledgements (NACKs) fed back from UEs 115a-115d and 115u-115z, network node 105b may determine the overall collision status of the CoMP cluster. Where the percentage of NACKs exceeds a threshold value (e.g., 60%, 70%, 80%, etc.), network node 105b may double its contention window size. Otherwise, where the percentage of NACKs remains within the threshold value, network node 105b may reset its contention window to the minimum contention window size.

According to the example aspects of the present disclosure described above, the floating-instant CoMP operation may be initiated by the network nodes in the CoMP cluster. Additional aspects of the present disclosure may further provide for UE-initiated floating-instant CoMP operations. In certain scenarios, there may be benefits to a UE-initiated CoMP through properly configured autonomous or configured uplink grants. For example, a lower latency uplink may be achieved without relying on scheduling requests. Additionally, opportunities for CoMP operations (either uplink or downlink) may be increased when the CoMP cluster network nodes have consistently failed to initiate CoMP operations triggered by the network.

Figure 9:
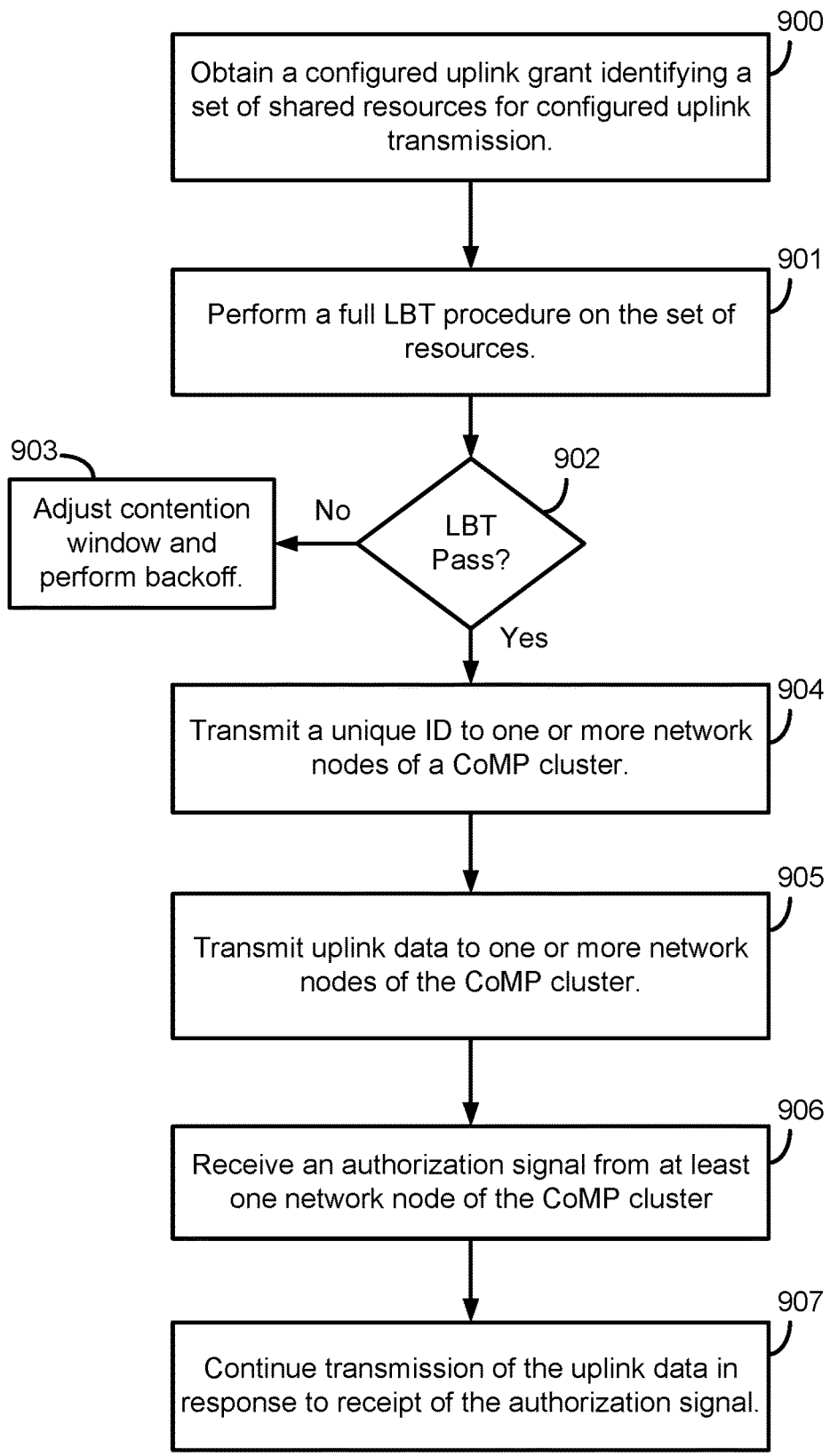
FIG. 9 is a block diagram illustrating example blocks executed to implement one aspect of the present disclosure.

FIG. 9 is a block diagram illustrating example blocks executed to implement one aspect of the present disclosure. The example blocks will also be described with respect to UE 115 as illustrated in FIG. 13.

At block 900, a UE obtains a configured uplink grant identifying a set of resources during which the UE may perform uplink transmissions without an uplink grant, wherein the set of resources are shared between one or more additional UEs. In networks that support autonomous or configured uplink transmissions, UEs, such as UE 115, obtain pre-configuration information on the set of uplink resource available for configured uplink transmissions via antennas 252a-r and wireless radios 1300a-r. Such pre-configuration information may be stored in memory 282 at configured uplink information 1302.

At block 901, the UE performs a full LBT procedure on the set of resources. In operating floating-instant CoMP operations, the UE, such as UE 115, executes, under control of controller/processor 280, floating-instant CoMP logic 1301, stored in memory 282. The execution environment of floating-instant CoMP logic 1301 provides UE 115 with the functionality and operations to recognize and perform floating-instant CoMP operations according to the various aspects of the present disclosure. To attempt access to the shared communication channel within the execution environment of floating-instant CoMP logic 1301, when the UEs, such as UE 115, reach the set of configured uplink resources, they will perform a full LBT procedure for access to the shared channel. Under control of controller/processor 280, UE 115 executes LBT logic 1303. The execution environment of LBT logic 1303 provides UE 115 with the functionality to perform various types of LBT procedures. In the attempt for access, UE 115 will perform a full LBT procedure, as facilitated by the execution environment of LBT logic 1303.

At block 902, the UE determines whether the LBT procedure was successful. If the LBT fails, then, at block 903, the UE will adjust its contention window and perform backoff before retrying the full LBT procedure at 901. Within the execution environment of floating-instant CoMP logic 1301, UE 115 will adjust the contention window size if the full LBT procedure is not successful. After doubling the contention window size, UE 115 may perform backoff before attempting access to the shared channel again by performing another full LBT procedure.

Otherwise, if the UE determines the LBT was successful, then, at block 904, the UE transmits a unique ID of the UE to one or more network nodes of a CoMP cluster. According to the illustrated aspect, within the execution environment of floating-instant CoMP logic 1301, UE 115, upon detecting the successful full LBT, transmits unique ID 1304, each stored in memory 282, to the serving network node via wireless radios 1300a-r and antennas 252a-r. Unique ID 1304 informs the serving network node of the identity of UE 115, which may be served by network nodes within the CoMP cluster.

At block 905, the UE transmits uplink data to one or more network nodes of the CoMP cluster. In addition to unique ID 1304, UE 115 transmits uplink data, at data 1305, stored in memory 282, to the network node via wireless radios 1300a-r and antennas 252a-r. The network node, in response to data 1305 and unique ID 1304 can determine whether the number of responding UEs is sufficient to meet the uplink CoMP transmission rules of the network.

At block 906, the UE receives an authorization signal from at least one network node of the CoMP cluster. Once the network node determines whether the number of UEs transmitting their unique IDs meets the CoMP transmission rules, it will transmit an authorization signal to the UEs, including UE 115, which indicates that the UEs are either approved or disapproved for continued uplink transmissions. Thus, UE 115, would receive the authorization signal from the network node via antennas 252a-r and wireless radios 1300a-r.

At block 907, the UE continues transmission of the uplink data in response to receipt of the authorization signal. When the authorization signal indicates that UE 115 is approved for continued transmission, functionality available within the execution environment of floating-instant CoMP logic 1301 prompts UE 115 to continue to transmit the uplink data, data 1305, via wireless radios 1300a-r and antennas 252a-r.

Figure 10:
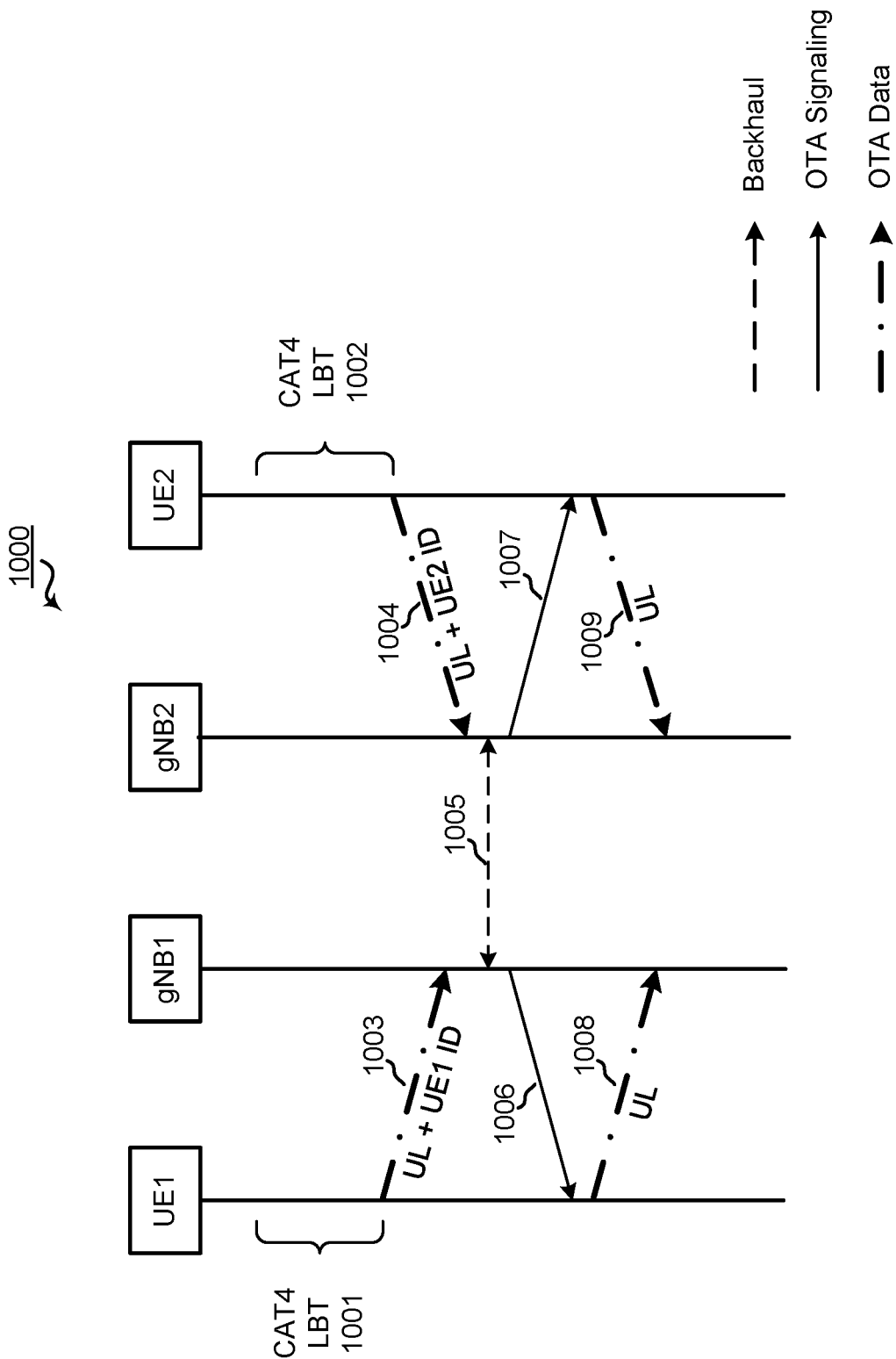
FIG. 10 is a block diagram illustrating a portion of a network having UEs and network nodes conducting floating-instant CoMP operations according to one aspect of the present disclosure.

FIG. 10 is a block diagram illustrating a portion of NR-U network 1000 having UE1, UE2, gNB1, and gNB2 conducting floating-instant CoMP operations according to one aspect of the present disclosure. gNB1 and gNB2 are configured as a CoMP cluster that serves UE1 and UE2 in NR-U network 1000. UE1 and UE2 are pre-configured with the same configured uplink grants for a set of uplink resources. The configured uplink grants allow UE1 and UE2 to access the shared communication channel at the same set of uplink resources through a full LBT procedure during the same resources. The pre-configuration information for configured uplink transmissions also defines when UE1 and UE2 will monitor for the approval feedback of NR-U network 1000 via one of gNB1 or gNB2.

In operation, UE1 and UE2 are pre-configured for the set of uplink resources to use for configured uplink transmissions. At the same set of resources, UE1 performs CAT4 LBT 1001 and UE2 performs CAT4 LBT 1002. Upon detecting success of CAT4 LBT 1001 and 1002, respectively, UE1 and UE2 send uplink signals 1003 and 1004, respectively, which include uplink data along with a unique identifier (ID) that uniquely identifies UE1 and UE2 to gNB1 and gNB2. gNB1 and gNB2 communicate the uplink information from uplink signals 1003 and 1004 to each other using backhaul signaling 1005. In response, one of gNB1 or gNB2 may transmit an authorization signal 1006 and 1007, which includes either an approval or disapproval for UE1 and UE2 to continue the configured uplink transmissions. If authorization signal 1006 and 1007 include an approval, then UE1 and UE2 may continue uplink data transmissions 1008 and 1009. Otherwise, where authorization signal 1006 and 1007 include a disapproval, UE1 and UE2 will stop the configured uplink transmissions.

The approval/disapproval may be determined based on various rules which are pre-defined by NR-U network 1000. For example, NR-U network 1000 may disallow incomplete uplink CoMP transmissions. Thus, if UE1 passes CAT4 LBT 1001 and UE2 fails CAT4 LBT 1002, the leading network node between gNB1 and gNB2 would send authorization signal 1006 with a disapproval. NR-U network 1000 may further define the rules to include a certain ratio of incomplete uplink CoMP transmissions. Thus, if a threshold number of UEs pass the full LBT procedure, the authorization signal will allow continued configured uplink transmissions from those UEs. The rules for approval or disapproval may be any variety of rules for transmission, medium coexistence, and the like.

Figure 11:
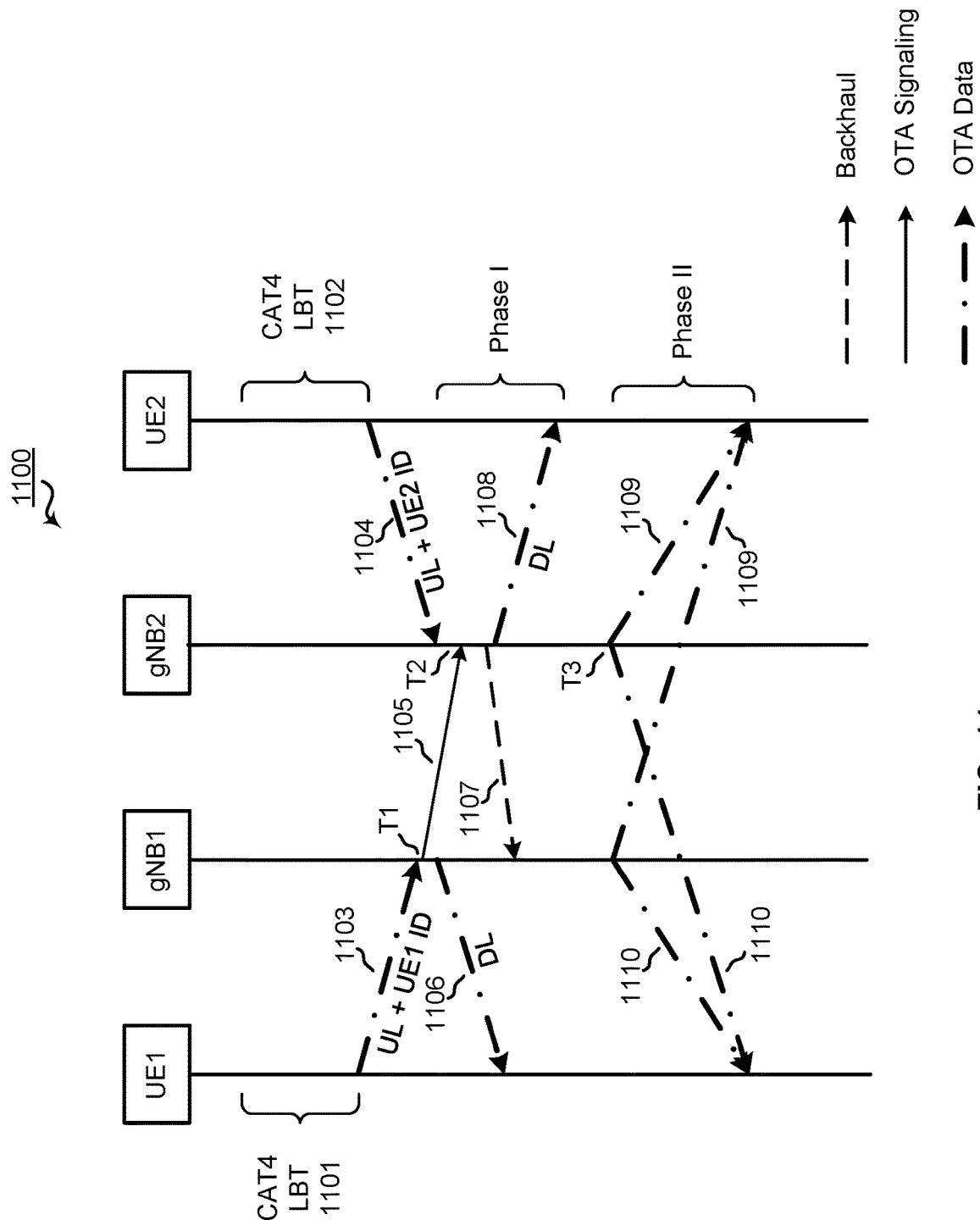
FIG. 11 is a block diagram illustrating a portion of an NR-U network having UEs and network nodes conducting floating-instant CoMP operations according to one aspect of the present disclosure.

FIG. 11 is a block diagram illustrating a portion of NR-U network 1100 having UE1, UE2, gNB1, and gNB2 conducting floating-instant CoMP operations according to one aspect of the present disclosure. In addition to the aspects providing for UE-initiated uplink CoMP transmissions, additional aspects of the present disclosure may provide for UE-initiated downlink CoMP transmissions. According to the illustrated aspect, the pre-configured signaling that provides UE1 and UE2 with identification of the set of configured uplink resources also provides UE1 and UE2 with identification of the network node that the UE will share its COT with.

In operation, at the same set of configured uplink resources, UE1 and UE2 perform CAT4 LBT 1101 and 1102, respectively, to access the shared communication channel. When UE1 passes CAT4 LBT 1101, it sends uplink signal 1103 including uplink data and the unique ID, to gNB1, which was identified to share the COT with UE1. In response, at time, T1, gNB1 initiates the phase one procedure of the downlink floating-instant CoMP operation. UE2 may send uplink signal 1104 to gNB2 after detecting success of CAT4 LBT 1102. However, as UE1 successfully completed CAT4 LBT 1101 first, the downlink CoMP process has been started by gNB1.

At the UE-initiated start of phase one, gNB1 transmits data 1106 in a single downlink transmission to UE1 and sends a CoMP scheduling message 1105 to gNB2, both transmitted OTA. As noted previously, CoMP scheduling message 1105 includes scheduling of the performance of the abbreviated LBT procedure at time, T2, and the joint CoMP transmission, at time, T3. Thus, at time, T2, gNB2 performs the abbreviated LBT procedure, and, if successful, transmits data 1108 in a single downlink transmission to UE2 and sends availability signal 1107 via backhaul to the leading network node, gNB1. At time, T3, phase two of the UE-initiated floating-instant CoMP operation begins. CoMP scheduling message 1105 schedules the network nodes of the CoMP cluster, gNB1 and gNB2, for joint downlink CoMP transmissions. gNB1 and gNB2 will then jointly transmit data 1109 to UE 2 and jointly transmit data 1110 to UE1.

In the UE-initiated floating-instant CoMP operations, each of UE1 or UE2 would double its minimum contention window size if CoMP operations did not result after success of the full LBT procedure. Otherwise, where CoMP operations result, UE1 and UE2 will reset the contention window to the minimum contention window size.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A, 5B, 5C, and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication may include performing, by a network node, a full LBT procedure on a shared communication channel in response to receipt of a trigger signal from a primary network node of a CoMP cluster configured for the network node and at least one neighboring network node; in response to success of the full LBT procedure, both initiating, by the network node, transmissions of downlink data to a served UE; and transmitting, by the network node, a CoMP scheduling message to each additional network node scheduled for CoMP transmission, wherein the CoMP scheduling message identifies a first schedule point for the each additional network node to perform an abbreviated LBT procedure on the shared communication channel and a second schedule point for initiating CoMP transmissions; monitoring, by the network node, for an availability signal from the each additional network node reporting results of the abbreviated LBT procedure; and switching, by the network node, the transmissions to joint CoMP transmissions with one or more available nodes of the each additional network node from which the network node detects the availability signal identifies success of the abbreviated LBT procedure.

A second aspect, based on the first aspect, further including signaling, by the network node, the each additional network node of the CoMP cluster to terminate attempt of CoMP operations, wherein the signaling is in response to one of no detection of the availability signal; or detection of the availability signal that identifies failure of the abbreviated LBT procedure.

A third aspect, based on the first aspect, wherein the trigger signal includes a starting time and an ending time defining a duration during which the trigger signal is valid.

A fourth aspect, based on the third aspect, wherein the trigger signal further includes configuration of at least one inactive zone within the duration during which one or more network nodes of the CoMP cluster refrains from performance of the full LBT procedure.

A fifth aspect, based on the fourth aspect, further including receiving, by the network node, configuration of a minimum contention window size for the at least one inactive zone, wherein the minimum contention window size is configured according to a priority class of the network node.

A sixth aspect, based on the fourth aspect, further including receiving, by the network node, configuration of configured uplink resources, wherein the configured uplink resources are located within the at least one inactive zone within the duration.

A seventh aspect, based on the third aspect, further including receiving, by the network node, a subsequent trigger signal from the primary network node, wherein the subsequent trigger signal replaces the trigger signal.

An eighth aspect, based on the first aspect, further including detecting, by the network node, early termination of the joint CoMP transmissions; doubling, by the network node, a contention window size in response to the detecting; selecting, by the network node, a new random number according to the doubled contention widow size; and re-performing, by the network node, the full LBT procedure after counting down from the new random number.

A ninth aspect, based on the eighth aspect, further including determining, by the network node, a collision status of the CoMP transmissions within the CoMP cluster over a detection period; doubling, by the network node, the contention window size in response to the collision status exceeding a threshold collision value; and resetting, by the network node, the contention window size to a minimum contention window size in response to the collision status within the threshold collision value.

A tenth aspect, based on the ninth aspect, wherein the threshold collision value is equivalent to 80% of acknowledgement feedback from all UEs served by the CoMP cluster identifying a negative acknowledgement.

An eleventh aspect, based on the first aspect, further including receiving, by the network node, a unique ID uniquely identifying one or more UEs served by the network node; receiving, by the network node, uplink data from the one or more UEs over a set of configured uplink resources; determining, by the network node, to one of: approve or disapprove of continued transmissions of the one or more UEs; and signaling, by the network node, an authorization message to the one or more UEs, wherein the authorization message includes a determination of the approval or disapproval of the continued transmissions.

A twelfth aspect, based on the eleventh aspect, wherein the determining to one of: approve or disapprove includes one of determining, by the network node, a number of the one or more UEs from which the unique ID is received is less than all of the UEs available for CoMP operations on the set of configured uplink resources, wherein the determination to disapprove the continued transmissions is made; or determining, by the network node, the number of the one or more UEs from which the unique ID is received is equal to all of the UEs available for the CoMP operations, wherein the determination to approve the continued transmissions is made.

A thirteenth aspect, based on the eleventh aspect, further including transmitting, by the network node, downlink data to the one or more UEs in response to determination of the network node to approve continued transmissions, wherein the authorization message includes identification of the approval.

A fourteenth aspect, based on the thirteenth aspect, wherein the joint CoMP transmissions are directed to the one or more UEs.

A fifteenth aspect of wireless communication may include performing, by a network node, a full LBT procedure on a shared communication channel in response to receipt of a trigger signal from a primary network node of a CoMP cluster configured for the network node and at least one neighboring network node; receiving, by the network node prior to completion of the full LBT procedure, a CoMP scheduling message from a leading network node of the CoMP cluster, wherein the CoMP scheduling message identifies a first schedule point for the network node to perform an abbreviated LBT procedure and a second schedule point for initiating CoMP transmissions; performing, by the network node, the abbreviated LBT procedure on the shared communication channel at the first schedule point; reporting, by the network node, results of the abbreviated LBT procedure to the leading network node; and commencing, by the network node, joint CoMP transmissions with the leading network node at the second schedule point in response to success of the abbreviated LBT procedure.

A sixteenth aspect, based on the fifteenth aspect, further including transmitting, by the network node, downlink data to a served UE at the first schedule point in response to the success of the abbreviated LBT procedure.

A seventeenth aspect, based on the fifteenth aspect, wherein the trigger signal includes a starting time and an ending time defining a duration during which the trigger signal is valid.

An eighteenth aspect, based on the seventeenth aspect, wherein the trigger signal further includes configuration of at least one inactive zone within the duration during which each network node of the CoMP cluster refrains from performance of the full LBT procedure.

A nineteenth aspect, based on the eighteenth aspect, further including receiving, by the network node, configuration of a minimum contention window size for the at least one inactive zone, wherein the minimum contention window size is configured according to a priority class of the network node.

A twentieth aspect, based on the eighteenth aspect, further including receiving, by the network node, configuration of configured uplink resources, wherein the configured uplink resources are located within the at least one inactive zone within the duration.

A twenty-first aspect, based on the seventeenth aspect, further including receiving, by the network node, a subsequent trigger signal from the primary network node, wherein the subsequent trigger signal replaces the trigger signal.

A twenty-second aspect, based on the fifteenth aspect, further including detecting, by the network node, an uplink CoMP scheduling message to one or more served UEs scheduled for uplink CoMP transmission; and in response to the uplink CoMP scheduling message suspending, by the network node, the performing the full LBT procedure; and monitoring, by the network node, for uplink transmissions from the one or more served UEs.

A twenty-third aspect, based on the twenty-second aspect, further including receiving, by the network node, a CoMP failure message from the leading network node; and retrying, by the network node, the full LBT procedure in response to the CoMP failure message.

A twenty-fourth aspect of wireless communication may include obtaining, by a UE, a configured uplink grant identifying a set of resources during which the UE may perform uplink transmissions without an uplink grant, wherein the set of resources are shared between one or more additional UEs; performing, by the UE, a full LBT procedure on the set of resources; in response to success of the full LBT procedure, both transmitting, by the UE, a unique ID of the UE to one or more network nodes of a CoMP cluster; and transmitting, by the UE uplink data to one or more network nodes of the CoMP cluster; receiving, by the UE, an authorization signal from at least one network node of the CoMP cluster; and continuing, by the UE, transmission of the uplink data in response to receipt of the authorization signal.

A twenty-fifth aspect, based on the twenty-fourth aspect, further including receiving, by the UE, downlink transmissions from a designated network node of the CoMP cluster after receipt of the authorization signal, wherein the designated network node is also identified to the UE in the configured uplink grant.

A twenty-sixth aspect, based on the twenty-fifth aspect, further including receiving, by the UE, downlink CoMP transmissions from two or more network nodes of the CoMP cluster at a period after the receiving the downlink transmissions from the designated network node.

A twenty-seventh aspect, based on the twenty-sixth aspect, further including in response to one of failure to receive the authorization signal, or failure to begin receipt of the downlink CoMP transmissions, doubling, by the UE, a current contention window size; and in response to one of receipt of the authorization signal, or receipt of the downlink CoMP transmissions, resetting, by the UE, the current contention window size to a minimum contention window size.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   performing, by a network node, a full listen before talk (LBT) procedure on a shared communication channel in response to receipt of a trigger signal from a primary network node of a coordinated multipoint (CoMP) cluster including the network node;
   in response to success of the full LBT procedure:
      initiating, by the network node, transmissions of downlink data to a served UE; and
      transmitting, by the network node, a CoMP scheduling message to each additional network node scheduled for CoMP transmission, wherein the CoMP scheduling message identifies a first schedule point for the each additional network node to perform an abbreviated LBT procedure on the shared communication channel and a second schedule point for initiating CoMP transmissions;
   monitoring, by the network node, for an availability signal from the each additional network node reporting results of the abbreviated LBT procedure; and
   switching, by the network node, the transmissions to joint CoMP transmissions with one or more available nodes of the each additional network node from which the network node detects the availability signal identifies success of the abbreviated LBT procedure,
   wherein the full LBT procedure comprises a category 4 (CAT 4) LBT procedure, and
   wherein the abbreviated LBT procedure comprises a category 2 (CAT 2) LBT procedure.

2. The method of claim 1, further including:
   signaling, by the network node, the each additional network node scheduled for COMP transmission to terminate attempt of COMP operations, wherein the signaling is in response to one of:
      no detection of the availability signal; or
      detection of the availability signal that identifies failure of the abbreviated LBT procedure.

3. The method of claim 1, wherein the trigger signal includes a starting time and an ending time defining a duration during which the trigger signal is valid.

4. The method of claim 3, wherein the trigger signal further includes configuration of at least one inactive zone within the duration during which one or more network nodes of the CoMP cluster refrains from performance of the full LBT procedure.

5. The method of claim 4, further including:
   receiving, by the network node, configuration of a minimum contention window size for the at least one inactive zone, wherein the minimum contention window size is configured according to a priority class of the network node.

6. The method of claim 4, further including:
   receiving, by the network node, configuration of configured uplink resources, wherein the configured uplink resources are located within the at least one inactive zone within the duration.

7. The method of claim 3, further including:
   receiving, by the network node, a subsequent trigger signal from the primary network node, wherein the subsequent trigger signal replaces the trigger signal.

8. The method of claim 1, further including:
   detecting, by the network node, early termination of the joint CoMP transmissions;
   doubling, by the network node, a contention window size in response to the detecting;
   selecting, by the network node, a new random number according to the doubled contention widow size; and
   re-performing, by the network node, the full LBT procedure after counting down from the new random number.

9. The method of claim 8, further including:
   determining, by the network node, a collision status of the CoMP transmissions within the CoMP cluster over a detection period;
   doubling, by the network node, the contention window size in response to the collision status exceeding a threshold collision value; and
   resetting, by the network node, the contention window size to a minimum contention window size in response to the collision status within the threshold collision value.

10. The method of claim 9, wherein the threshold collision value is equivalent to 80% of acknowledgement feedback from all user equipments (UEs) served by the CoMP cluster identifying a negative acknowledgement.

11. The method of claim 1, further including:
    receiving, by the network node, a unique identifier (ID) uniquely identifying one or more user equipments (UEs) served by the network node;
    receiving, by the network node, uplink data from the one or more UEs over a set of configured uplink resources;
    determining, by the network node, to one of: approve or disapprove of continued transmissions of the one or more UEs; and
    signaling, by the network node, an authorization message to the one or more UEs, wherein the authorization message includes a determination of the approval or disapproval of the continued transmissions.

12. The method of claim 11, wherein the determining to one of: approve or disapprove includes one of:
   determining, by the network node, a number of the one or more UEs from which the unique ID is received is less than all of the UEs available for COMP operations on the set of configured uplink resources, wherein the determination to disapprove the continued transmissions is made; or
   determining, by the network node, the number of the one or more UEs from which the unique ID is received is equal to all of the UEs available for the CoMP operations, wherein the determination to approve the continued transmissions is made.

13. The method of claim 11, further including:
   transmitting, by the network node, downlink data to the one or more UEs in response to determination of the network node to approve continued transmissions, wherein the authorization message includes identification of the approval.

14. The method of claim 13, wherein the joint CoMP transmissions are directed to the one or more UEs.

15. An apparatus configured for wireless communication, the apparatus comprising:
   at least one processor; and
   a memory coupled to the at least one processor,
   wherein the at least one processor is configured:
      to perform a full listen before talk (LBT) procedure on a shared communication channel in response to receipt of a trigger signal from a primary network node of a coordinated multipoint (CoMP) cluster including the network node;
      in response to success of the full LBT procedure:
         to initiate transmissions of downlink data to a served UE; and
         to transmit a CoMP scheduling message to each additional network node scheduled for CoMP transmission, wherein the CoMP scheduling message identifies a first schedule point for the each additional network node to perform an abbreviated LBT procedure on the shared communication channel and a second schedule point for initiating CoMP transmissions;
      to monitor for an availability signal from the each additional network node reporting results of the abbreviated LBT procedure; and
      to switch the transmissions to joint COMP transmissions with one or more available nodes of the each additional network node from which the network node detects the availability signal identifies success of the abbreviated LBT procedure,
   wherein the full LBT procedure comprises a category 4 (CAT 4) LBT procedure, and
   wherein the abbreviated LBT procedure comprises a category 2 (CAT 2) LBT procedure.

16. The apparatus of claim 15, further including configuration of the at least one processor:
   to detect early termination of the joint CoMP transmissions;
   to double a contention window size in response to the detecting;
   to select a new random number according to the doubled contention widow size; and
   to re-perform the full LBT procedure after counting down from the new random number.

17. The apparatus of claim 15, further including configuration of the at least one processor:
   to receive a unique identifier (ID) uniquely identifying one or more user equipments (UEs) served by the network node;
   to receive uplink data from the one or more UEs over a set of configured uplink resources;
   to determine to one of: approve or disapprove of continued transmissions of the one or more UEs; and
   to signal an authorization message to the one or more UEs, wherein the authorization message includes a determination of the approval or disapproval of the continued transmissions.

* * * * *